(12) United States Patent
Yin

(10) Patent No.: US 11,496,564 B2
(45) Date of Patent: Nov. 8, 2022

(54) DEVICE STATE SYNCHRONIZATION METHOD AND COMMON CAPABILITY COMPONENT

(71) Applicant: Huawei Cloud Computing Technologies Co., Ltd., Gui'an New District (CN)

(72) Inventor: Jiaxin Yin, Nanjing (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 0 days.

(21) Appl. No.: 17/075,437

(22) Filed: Oct. 20, 2020

(65) Prior Publication Data
US 2021/0037093 A1 Feb. 4, 2021

Related U.S. Application Data

(63) Continuation of application No. PCT/CN2019/082957, filed on Apr. 17, 2019.

(30) Foreign Application Priority Data

Apr. 20, 2018 (CN) .......................... 201810362144.X

(51) Int. Cl.
*H04L 67/1095* (2022.01)
*G06F 9/448* (2018.01)
*G06F 9/50* (2006.01)

(52) U.S. Cl.
CPC .......... *H04L 67/1095* (2013.01); *G06F 9/448* (2018.02); *G06F 9/5011* (2013.01)

(58) Field of Classification Search
CPC ..... H04L 67/1095; G06F 9/448; G06F 9/5011
See application file for complete search history.

(56) References Cited

U.S. PATENT DOCUMENTS

| 9,887,889 | B1* | 2/2018 | Dippenaar | .......... H04L 43/0817 |
| 10,523,537 | B2* | 12/2019 | Turow | .................. H04L 41/06 |

(Continued)

FOREIGN PATENT DOCUMENTS

| CN | 103546433 A | 1/2014 |
| CN | 105323228 A | 2/2016 |

(Continued)

OTHER PUBLICATIONS

Ren Rui-fang et al.,"The Research and Improvement oF IoT Equipment Remote Control Technology," Computer Knowledge and Technology, vol. 11, No. 11, total 4 pages (Apr. 2015). With English abstract.

(Continued)

*Primary Examiner* — Azizul Choudhury
(74) *Attorney, Agent, or Firm* — Leydig, Voit & Mayer, Ltd.

(57) ABSTRACT

This application discloses a device state synchronization method. The method performed by a common capability component, the method includes: receiving a first representation state instance resource creation request sent by an application, where the first representation state instance resource creation request includes a device state attribute; creating a first representation state instance resource based on the first representation state instance resource creation request and a created second representation state instance resource; sending a device state update request to a device, where the device state update request includes the device state attribute; receiving an actual state instance resource creation request sent by the device; creating an actual state instance resource based on the actual state instance resource creation request; and sending to the application, information indicating that an actual state resource is successfully created.

6 Claims, 15 Drawing Sheets

(56) References Cited

U.S. PATENT DOCUMENTS

| | | |
|---|---|---|
| 2010/0262664 A1 | 10/2010 | Brown et al. |
| 2011/0296342 A1* | 12/2011 | Mantri ................ G06F 11/3055 715/790 |
| 2014/0215043 A1 | 7/2014 | Ryu et al. |
| 2018/0091391 A1* | 3/2018 | Turow .................... H04L 41/06 |
| 2018/0242177 A1 | 8/2018 | Wu |
| 2018/0343590 A1 | 11/2018 | Wang et al. |
| 2019/0124573 A1 | 4/2019 | Yin et al. |

FOREIGN PATENT DOCUMENTS

| | | |
|---|---|---|
| CN | 106453657 A | 2/2017 |
| CN | 106714199 A | 5/2017 |
| CN | 106776947 A | 5/2017 |
| CN | 107026882 A | 8/2017 |
| CN | 107484211 A | 12/2017 |
| WO | 2015117482 A1 | 8/2015 |
| WO | 2016173280 A1 | 11/2016 |
| WO | 2017133496 A1 | 8/2017 |

OTHER PUBLICATIONS

"ARC tutorial DRAFT (list of authors will be updated)," ARC-2014-1662-ARC_Tutorial_Draft. ZIP, ONEM2M, vol. WG2—Architecture, ARC, pp. 1-88 (Oct. 16, 2014).

* cited by examiner

DEVICE STATE SYNCHRONIZATION METHOD AND COMMON CAPABILITY COMPONENT

CROSS-REFERENCE TO RELATED APPLICATIONS

This application is a continuation of International Application No. PCT/CN2019/082957 filed on Apr. 17, 2019, which claims priority to Chinese Patent Application No. 201810362144.X filed on Apr. 20, 2018. The disclosures of the aforementioned applications are hereby incorporated by reference in their entireties.

TECHNICAL FIELD

This application relates to the communications field, and in particular, to a device state synchronization method and a common capability component.

BACKGROUND

An internet of things (IoT) system may include a platform, a gateway, a device, and an application. FIG. 1 is a schematic flowchart of interaction between an application, a common capability component (CSE), and a device. The CSE is a common capability component defined in the internet of things system.

When the application intends to update an actual state of the device, the application first sends a resource update request to the CSE to update a representation state of the device. After successfully updating a resource state, the CSE returns an update success response to the application. The device monitors a resource change in a polling or subscription manner. In FIG. 2, a notification subscription method is used, that is, the device subscribes to the resource change. If a resource changes, the CSE sends a notification to the device. The notification includes a latest state after the resource changes. When the device receives the notification and detects the resource change, the device first returns a notification reception response to the CSE, and then updates the actual state of the device through a local hardware driver or interface.

However, the CSE allows only one application to update a resource at a time. In addition, when receiving a resource update request sent by an application, the CSE locks the resource and rejects another request, reducing system availability.

SUMMARY

Embodiments of this application provide a device state synchronization method, used by a common capability component to complete synchronization between a representation state and an actual state of a device, to improve processing efficiency.

In view of this, a first aspect of the embodiments of this application provides a device state synchronization method. The method may include: A common capability component receives a first representation state instance resource creation request sent by an application, where the first representation state instance resource creation request may include a device state attribute. It may be understood that the first representation state instance resource creation request may also be referred to as a representation state resource update request. The common capability component creates a first representation state instance resource based on the first representation state instance resource creation request and a created second representation state instance resource. That is, the common capability component maintains more than one representation state instance resource. The common capability component sends a device state update request to a device, where the device state update request includes the device state attribute. The common capability component receives an actual state instance resource creation request sent by the device. The common capability component creates an actual state instance resource based on the actual state instance resource creation request. The common capability component sends, to the application, information indicating that the actual state resource is successfully created.

In this embodiment of this application, the common capability component may maintain a plurality of representation state instance resources. The common capability component stores a representation state resource and the actual state resource of the device, and is responsible for synchronization with an actual state of the device, thereby improving processing efficiency.

Optionally, in some embodiments of this application, the first representation state instance resource and the second representation state instance resource are child resources of a representation state resource. The representation state resource may include an update mode and a time mode. The update mode may include a sequence state or a latest state. The time mode includes a moment mode, a duration mode, or a mixed mode. The mixed mode is the moment mode plus the duration mode.

When the update mode is the sequence state, it indicates that the common capability component may sequentially transfer requests of the application for the representation state resource to the device one by one. None of the requests can be ignored, and sequences of the requests need to be consistent.

When the update mode is the latest state, it indicates that the common capability component may delete a request sent by the application for the representation state resource. When the common capability component finds that a connection status of the device is an unreachable state, the common capability component needs to retain only a latest representation state instance resource, and other old representation state instance resources may be discarded. After a connection of the device is restored or an address of the device is configured, the common capability component needs to send only a device state in the latest representation state instance resource to the device.

When the time mode is the moment mode, it indicates that the request needs to be executed on a side of the device at a specified moment, that is, the device needs to change a device state at the specified moment, for example, a switch is turned on or off at the specified moment.

When the time mode is the duration mode, it indicates that the request requires the device to maintain, for specified duration, a state that is obtained after execution of the request.

When the time mode is the moment mode plus the duration mode, it indicates that the device needs to change a state of the device at a specific time point and maintain the state for a specific period of time.

Optionally, in some embodiments of this application, the first representation state instance resource creation request includes an identifier of the representation state resource, and at least one attribute of a first state moment and first state duration. In this embodiment of this application, the identifier of the representation state resource may indicate that the first representation state instance resource creation request is a request for creating a child resource that belongs to the representation state resource.

Optionally, in some embodiments of this application, that the common capability component creates the first representation state instance resource based on the first representation state instance resource creation request and a created second representation state instance resource may include: The common capability component creates the first representation state instance resource based on the second representation state instance resource and the at least one attribute of the first state moment and the first state duration. In this embodiment of this application, when creating the first representation state instance resource, the common capability component may specifically create the first representation state instance resource based on the second representation state instance resource and the at least one attribute of the first state moment and the first state duration. This provides a feasible solution for creating the first representation state instance resource.

Optionally, in some embodiments of this application, the first representation state instance resource creation request may include the first state moment and the first state duration. That the common capability component sends a device state update request to a device may include: The common capability component sends the device state update request to the device at a time point indicated by the first state moment, and indicates the device to maintain the device state unchanged within a time length indicated by the first state duration. In this embodiment of this application, the common capability component may alternatively determine, based on the first state moment, a time point for sending the device state update request to the device, and indicate the device to maintain the device state unchanged within a time length indicated by the first state duration.

Optionally, in some embodiments of this application, the representation state resource includes a connection status attribute, and the connection status attribute indicates a time period [t1, t2] in which the common capability component is connected to the device. The update mode of the representation state resource is the sequence state, and the time mode is the moment mode. The first representation state instance resource creation request includes the first state moment.

That the common capability component creates the first representation state instance resource based on the first representation state instance resource creation request and a created second representation state instance resource may include: If the common capability component determines that the first state moment falls within the time period [t1, t2] and is different from a second state moment of the created second representation state instance resource, the common capability component creates the first representation state instance resource.

In this embodiment of this application, when the update mode of the representation state resource is the sequence state, and the time mode is the moment mode, a specific implementation solution in which the common capability component creates the first representation state instance resource is provided, thereby increasing feasibility of the technical solution.

Optionally, in some embodiments of this application, the representation state resource includes a connection status attribute, and the connection status attribute indicates a time period [t1, t2] in which the common capability component is connected to the device. The update mode of the representation state resource is the sequence state, and the time mode is the mixed mode. The first representation state instance resource creation request includes the first state moment and the first state duration.

That the common capability component creates the first representation state instance resource based on the first representation state instance resource creation request and a created second representation state instance resource may include:

(1) if the common capability component determines that a first time period falls within the time period [t1, t2] and does not overlap a second time period of the created second representation state instance resource, the common capability component creates the first representation state instance resource, where the first time period uses the first state moment as a start moment and has a time length of the first state duration; or (2) if the common capability component determines that the first state moment falls within the time period [t1, t2] and is different from a second state moment of the created second representation state instance resource, the common capability component creates the first representation state instance resource; or (3) if the common capability component determines that the first state duration falls within any idle time period in the time period [t1, t2] except a second time period of the created second representation state instance resource, the common capability component creates the first representation state instance resource.

In this embodiment of this application, when the update mode of the representation state resource is the sequence state, and the time mode is the mixed mode, a specific implementation solution in which the common capability component creates the first representation state instance resource is provided, thereby increasing feasibility of the technical solution.

Optionally, in some embodiments of this application, the representation state resource includes a connection status attribute, and the connection status attribute indicates a time period [t1, t2] in which the common capability component is connected to the device. The update mode of the representation state resource is the sequence state, and the time mode is the duration mode. The first representation state instance resource creation request includes the first state duration.

That the common capability component creates the first representation state instance resource based on the first representation state instance resource creation request and a created second representation state instance resource may include: If the common capability component determines that the first state duration falls within any idle time period in the time period [t1, t2] except a second time period of the created second representation state instance resource, the common capability component creates the first representation state instance resource.

In this embodiment of this application, when the update mode of the representation state resource is the sequence state, and the time mode is the duration mode, a specific implementation solution in which the common capability component creates the first representation state instance resource is provided, thereby increasing feasibility of the technical solution.

Optionally, in some embodiments of this application, the representation state resource includes a connection status attribute, and the connection status attribute indicates a time period [t1, t2] in which the common capability component is connected to the device. The update mode of the representation state resource is the latest state, and the time mode is the moment mode. The first representation state instance resource creation request includes the first state moment.

That the common capability component creates the first representation state instance resource based on the first representation state instance resource creation request and a created second representation state instance resource may include: If the common capability component determines that the first state moment falls within the time period [t1, t2] and is different from a second state moment of the created second representation state instance resource, the common capability component deletes the second representation state instance resource, and creates the first representation state instance resource.

In this embodiment of this application, when the update mode of the representation state resource is the latest state, and the time mode is the moment mode, a specific implementation solution in which the common capability component creates the first representation state instance resource is provided, thereby increasing feasibility of the technical solution.

Optionally, in some embodiments of this application, the representation state resource includes a connection status attribute, and the connection status attribute indicates a time period [t1, t2] in which the common capability component is connected to the device. The update mode of the representation state resource is the latest state, and the time mode is the mixed mode. The first representation state instance resource creation request includes the first state moment and the first state duration.

That the common capability component creates the first representation state instance resource based on the first representation state instance resource creation request and a created second representation state instance resource may include:

(1) if the common capability component determines that a first time period falls within the time period [t1, t2] and overlaps a second time period of the created second representation state instance resource, the common capability component deletes the second representation state instance resource, and creates the first representation state instance resource, where the first time period uses the first state moment as a start moment and has a time length of the first state duration; or (2) if the common capability component determines that the first state moment falls within the time period [t1, t2] and is different from a second state moment of the created second representation state instance resource, the common capability component, deletes the second representation state instance resource and creates the first representation state instance resource; or (3) if the common capability component determines that the first state duration falls within the time period [t1, t2], and the first state duration and a third time period that is obtained at t1 do not overlap a second time period of the created second representation state instance resource, the common capability component, deletes the second representation state instance resource and creates the first representation state instance resource.

In this embodiment of this application, when the update mode of the representation state resource is the latest state, and the time mode is the mixed mode, a specific implementation solution in which the common capability component creates the first representation state instance resource is provided, thereby increasing feasibility of the technical solution.

Optionally, in some embodiments of this application, the representation state resource includes a connection status attribute, and the connection status attribute indicates a time period [t1, t2] in which the common capability component is connected to the device. The update mode of the representation state resource is the latest state, and the time mode is the duration mode. The first representation state instance resource creation request includes the first state duration.

That the common capability component creates a first representation state instance resource based on the first representation state instance resource creation request and a created second representation state instance resource may include: If the common capability component determines that the first state duration falls within the time period [t1, t2], and the first state duration and a third time period that is obtained at t1 overlap a second time period of the created second representation state instance resource, the common capability component deletes the second representation state instance resource, and creates the first representation state instance resource.

In this embodiment of this application, when the update mode of the representation state resource is the latest state, and the time mode is the duration mode, a specific implementation solution in which the common capability component creates the first representation state instance resource is provided, thereby increasing feasibility of the technical solution.

Optionally, in some embodiments of this application, before that a common capability component receives a first representation state instance resource creation request sent by an application, the method may further include: The common capability component receives a representation state resource creation request. The common capability component creates a representation state resource based on the representation state resource creation request. The common capability component receives an actual state resource creation request. The common capability component creates an actual state resource based on the actual state resource creation request.

A second aspect of the embodiments of this application provides a common capability component, having a function of completing synchronization between a representation state and an actual state of a device, and improving processing efficiency. The function may be implemented by hardware, or by hardware executing corresponding software. The hardware or software includes one or more modules corresponding to the foregoing function.

Still another aspect of the embodiments of this application provides a common capability component, and the common capability component may include: a transceiver, configured to communicate with an apparatus other than the common capability component; a memory, configured to store a computer executable instruction; and one or more processors, connected to the memory and the transceiver through a bus, and configured to execute the computer executable instruction stored in the memory and one or more computer programs. The one or more computer programs are stored in the memory. The one or more computer programs include an instruction, and when the instruction is executed by the common capability component, the common capability component is enabled to perform the method in any one of the foregoing aspects or any optional implementation of the aspects.

Still another aspect of the embodiments of this application provides a wireless communications apparatus, and the wireless communications apparatus may include: at least one processor, a memory, a transceiver circuit, and a bus system. The processor, the memory, and the transceiver circuit are coupled by using the bus system. The wireless communications apparatus communicates with a server through the transceiver circuit. The memory is configured to store a program instruction. The at least one processor is configured to execute the program instruction stored in the memory. The wireless communications apparatus is enabled to perform the part performed by the common capability component in the method in the foregoing aspects of the embodiments of this application. The wireless communications apparatus may be a common capability component, or may be a chip that is applied to a platform, a gateway, or a device to perform a corresponding function.

Still another aspect of the embodiments of this application provides a storage medium. It should be noted that the technical solutions of this application essentially, or the part contributing to the prior art, or all or some of the technical solutions may be implemented in a form of a software product. The computer software product is stored in the storage medium, configured to store a computer software instruction used by the foregoing common capability component. The computer software instruction includes a program executed by and designed for the common capability component in the foregoing aspects. Alternatively, the storage medium is configured to store a computer software instruction used by the foregoing server. The computer software instruction includes a program executed by and designed for the server in the foregoing aspects.

The storage medium includes any medium that can store program code, such as a USB flash drive, a removable hard disk, a read-only memory (ROM, Read-Only Memory), a random access memory (RAM, Random Access Memory), a magnetic disk, or an optical disc.

Still another aspect of the embodiments of this application provides a computer program product including an instruction, and when the computer program product is run on a computer, the computer is enabled to perform the method in any one of the foregoing aspects or any optional implementation of the foregoing aspects.

BRIEF DESCRIPTION OF DRAWINGS

To describe the technical solutions of the embodiments of this application more clearly, the following briefly describes the accompanying drawings required for describing the prior art or the embodiments. It is clear that the accompanying drawings in the following description show merely some embodiments of this application, and other drawings may still be derived from these accompanying drawings.

DESCRIPTION OF EMBODIMENTS

Embodiments of this application provide a device state synchronization method, used by a common capability component to complete synchronization between a representation state and an actual state of a device, to improve processing efficiency.

To make persons skilled in the art understand the solutions in this application better, the following describes the technical solutions in the embodiments of this application with reference to the accompanying drawings in the embodiments of this application. It is clear that the described embodiments are merely some rather than all of the embodiments of this application. All the embodiments in this application shall fall within the protection scope of this application.

In an IoT system, a platform, a gateway, and a device play different roles in an entire internet of things architecture. As an aggregator of information, the platform is responsible for providing an application with an application programming interface (API) interface for invoking various capabilities. As a relay of information, the gateway needs to collect data from the device and deliver the data, and needs to report data to the platform or receive instructions from the platform. The device is a collector and an executor of information, and widely exists at an end of various IoT systems, such as a temperature sensor, a servo motor, a head unit, and a machine tool.

Figure 2:
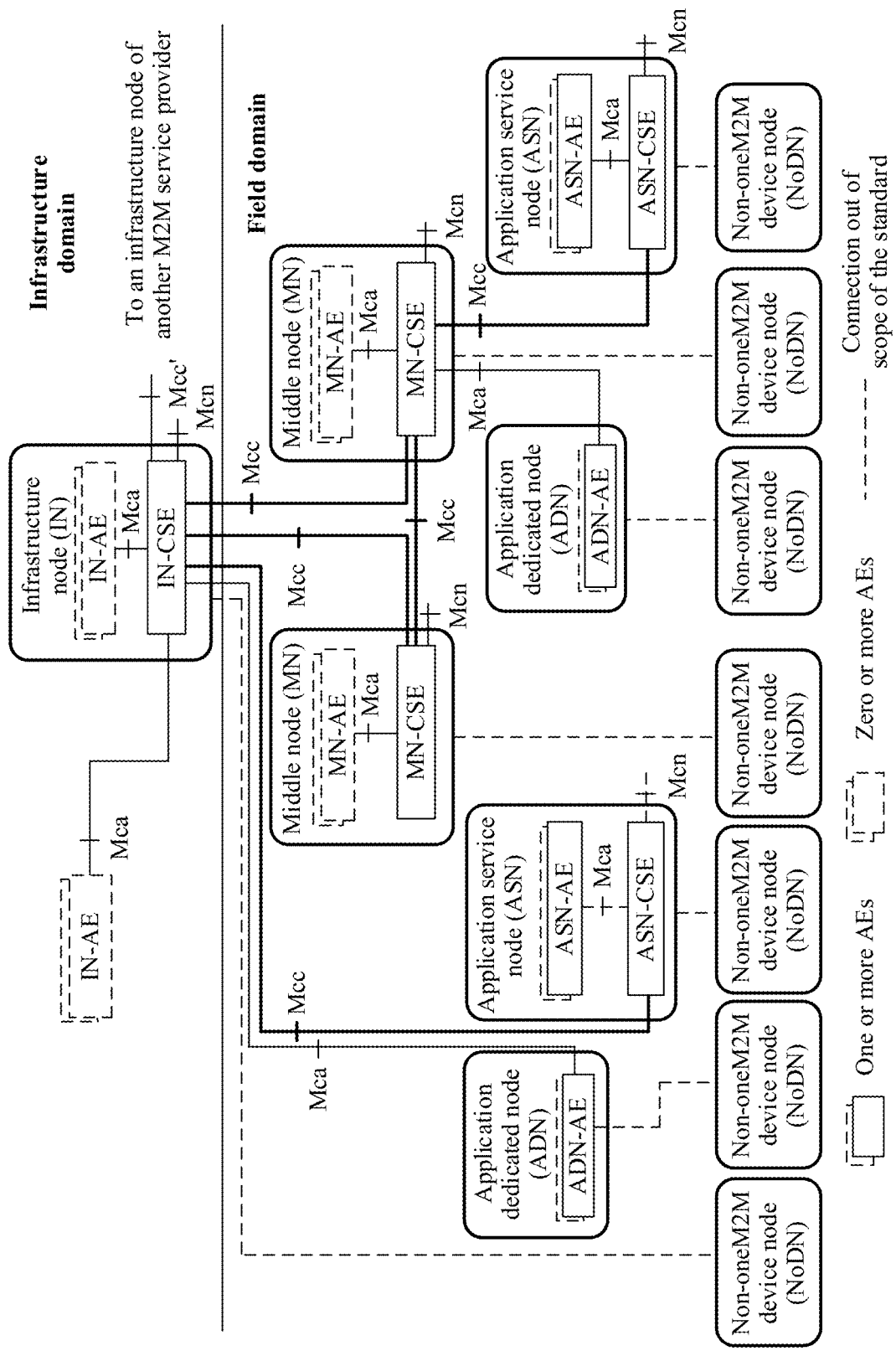
FIG. 2 is an architectural diagram of an IoT system defined by an international standardization organization in the internet of things field according to an embodiment of this application.

For example, FIG. 2 is an architectural diagram of an IoT system defined by an international standardization organization oneM2M standard in the internet of things field. In a oneM2M architecture shown in FIG. 2, an infrastructure node (IN) is a platform, a middle node (MN) is a gateway, and devices are classified into two types: an application dedicated node (ADN) and an application service node (ASN), respectively applicable to a restricted device and a device with rich resources. The IN, the MN, the ASN, and the ADN are device types defined by oneM2M and comply with a oneM2M specification. Devices that do not comply with the oneM2M specification are collectively represented by a non-oneM2M device (NoDN) in the oneM2M. Such devices comply with another IoT specification, such as Z-Wave, ZigBee, or Bluetooth, are connected to a oneM2M system through interworking, and therefore, may access services through interfaces defined by the oneM2M.

Among the nodes defined by the oneM2M, some nodes have a common capability component (CSE), for example, the infrastructure node (IN), the middle node (MN), and the application service node (ASN). Some nodes have no CSE, for example, the application dedicated node (ADN). The CSE is a common capability component defined by the oneM2M, and may include common capabilities for applications in different industries, for example, device registration, device management, data delivery and reporting, and event subscription. The CSE opens an interface externally to help an application invoke these common capabilities.

The CSE externally provides interfaces of these common capabilities in a form of a resource. The resource may be understood as an information segment held by the CSE. The information segment may be a document, a database record, or the like. The resource records a context in which the CSE externally provides a service and content of the service. The capabilities such as device registration and data reporting and delivery opened by the CSE externally are implemented through resource access. The resource may be created (Create), updated (Update), retrieved (Retrieve), and deleted (Delete), thereby representing an interface provided in an entire life cycle of a common capability provided by the CSE. Creation indicates registration and generation of the common capability. Update may be used to update all or part of information about the capability. Retrieving may be used to monitor a state of the common capability. Deletion may be used to destroy and deregister the common capability.

A key common capability provided by the CSE is device state synchronization. In the IoT system, a device service needs to be synchronized with the IoT system in a digital form to invoke the device service through a software-defined network interface. This is specifically data reporting and delivery. The data reporting may be reporting data to the platform after a sensor collects the data. Then an application registered with the platform may read the data through the platform. Alternatively, an application registered with the platform may deliver a control command to the platform by using the capability. A controller reads specific content of the control command from the platform and then performs a corresponding operation.

Figure 1:
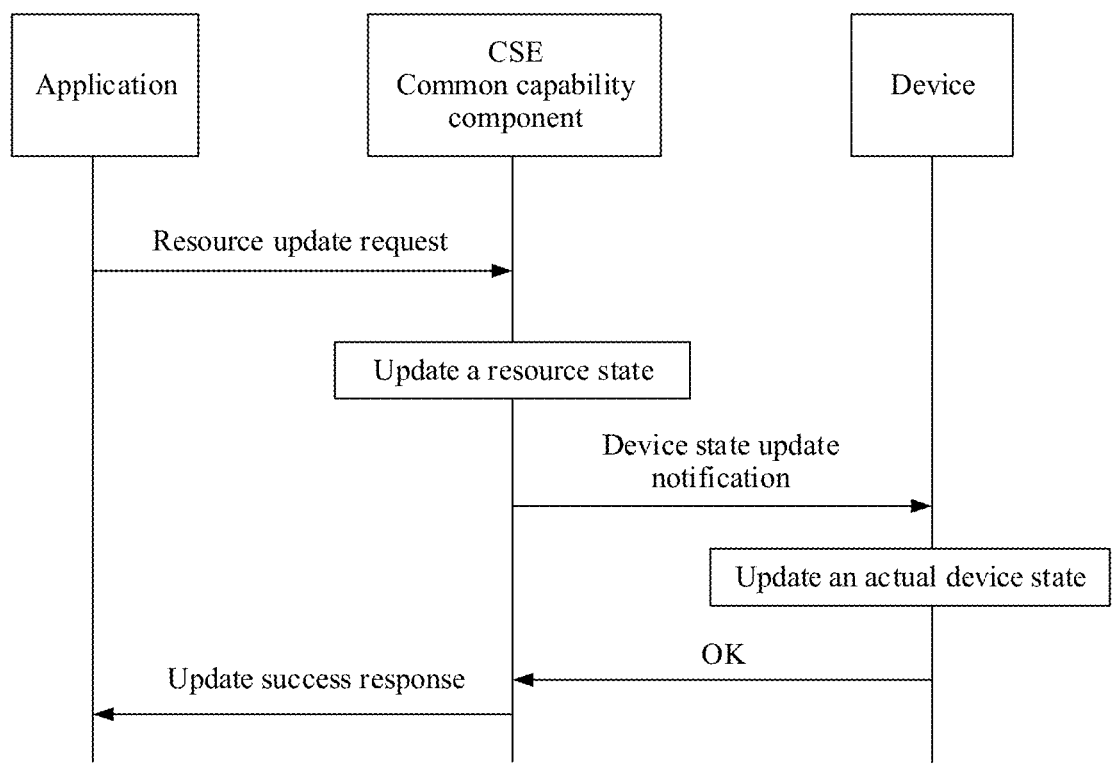
FIG. 1 is a schematic flowchart of interaction between an application, a common capability component, and a device in the prior art.

As shown in FIG. 1, the application may be specifically an application registered with the platform, and may be understood as an infrastructure node application entity (IN-AE). The CSE stores a resource (for example, a representation state resource of the device) that indicates a device state. The device may be specifically understood as an application entity (ADN-AE) on the application dedicated node, that is, an application on the device. The application on the device is used to synchronize an actual state of the device and a resource state in the CSE.

If a link between the CSE and the device is faulty, the CSE does not successfully send a notification to the device in time, but the resource on the CSE is updated, a case in which the representation state of the device is inconsistent with the actual state of the device is caused. If the CSE successfully sends a notification to the ADN-AE but the actual state of the device is not switched due to a hardware fault or unexpected breakdown of the device, a case in which the representation state is inconsistent with the actual state may also be caused.

Figure 3:
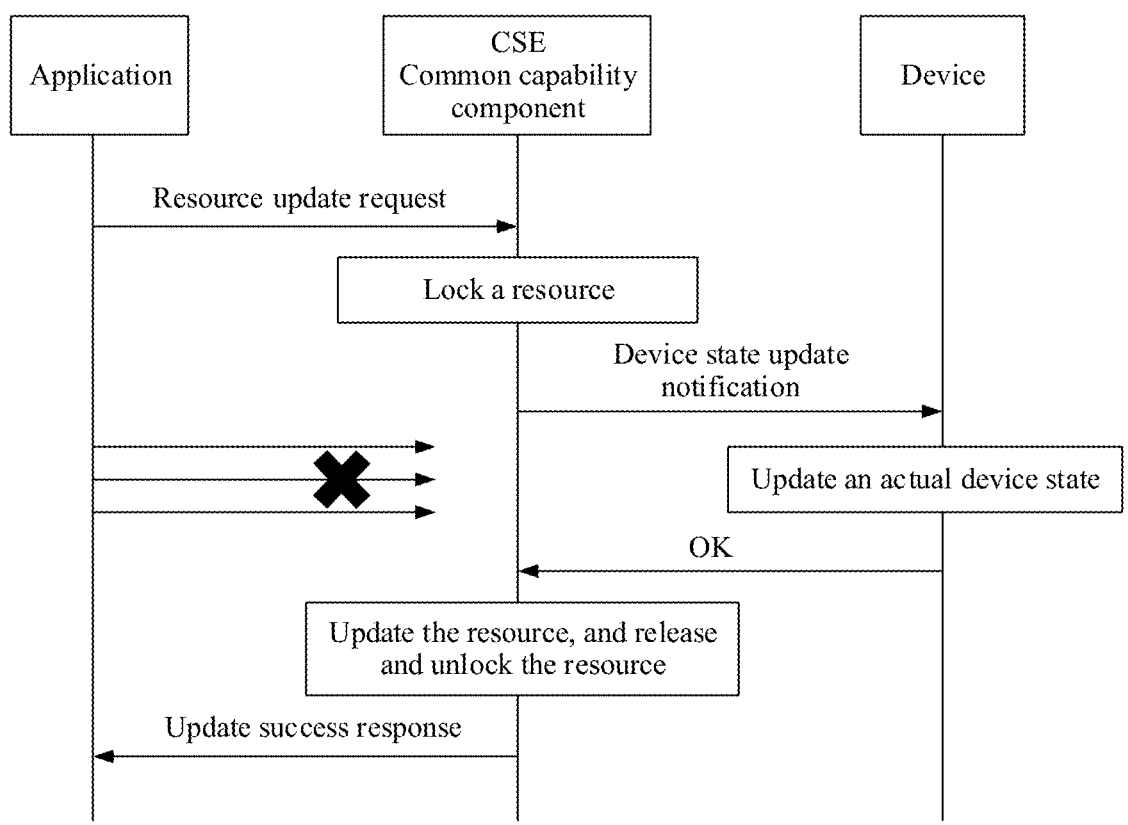
FIG. 3 is a schematic flowchart of a blocking solution.

In an implementation, FIG. 3 is a schematic flowchart of a blocking solution. When the CSE receives a resource update request from the application, the CSE does not update the resource immediately, but locks the resource and further sends a notification to the device. The device sends a success response to the CSE only after the device actually updates the device state. The CSE updates the resource only after receiving the success response, and returns an update success response to the IN-AE.

However, the CSE rejects any other requests during resource locking, consequently reducing system availability. If the device cannot respond immediately for various reasons, the resource on the CSE is to be locked for a long time, causing the entire system to stop.

Figure 4:
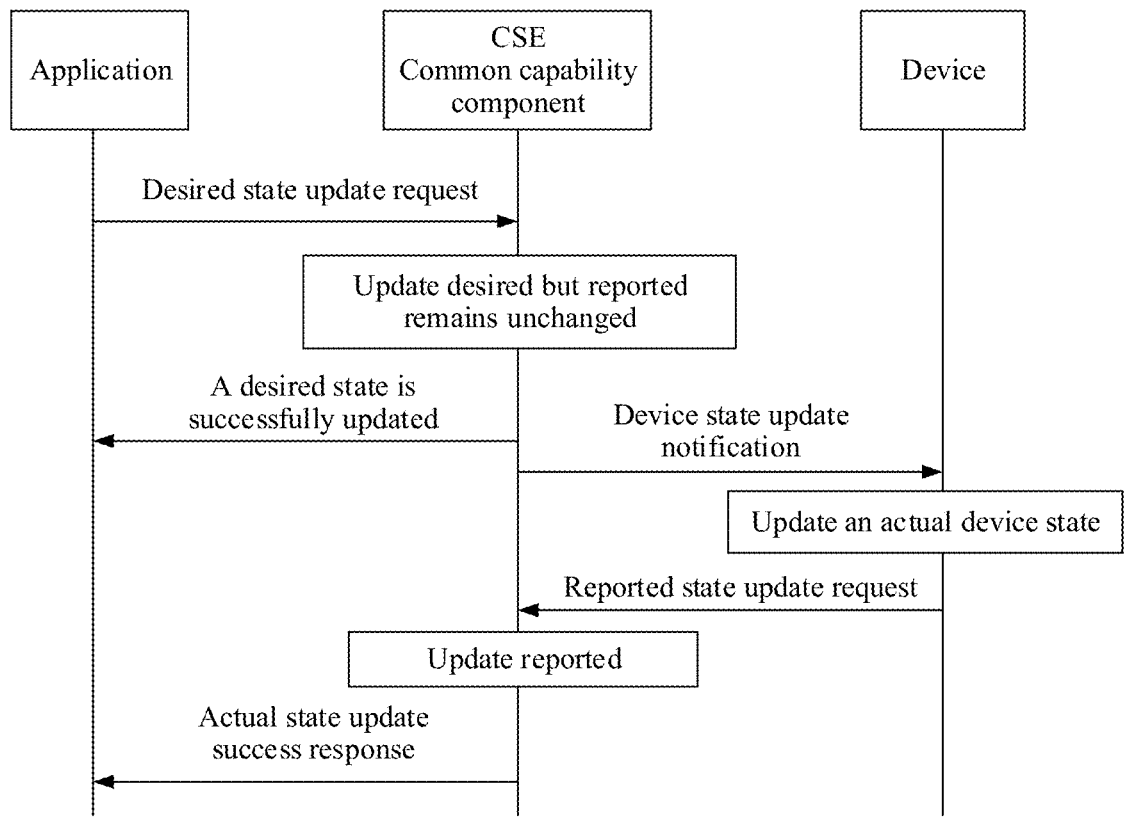
FIG. 4 is a schematic flowchart of a ThingShadow solution.

In another implementation, for example, ThingShadow is a device state synchronization solution in an Amazon web service (AWS) IoT. The IoT platform maintains two states for a device: desired and reported. Desired is used to indicate a device state desired by the application, and reported is used to indicate an actual state of a device. When the application intends to obtain the actual state of the device, the application sends an obtaining request to the IoT platform to access reported resources. When the application intends to change the device state, the application sends an update request to the IoT platform to access desired resources. The AWS platform gradually synchronizes desired and reported states based on other environments. FIG. 4 is a schematic flowchart of a ThingShadow solution.

For example, to control a switch, in AWS ThingShadow mode, an application first sends an update request to the CSE to access desired resources and update desired=ON to turn on the switch. At this time, because the actual state of the device has not changed, reported=OFF. The device subscribes to desired in advance to track a switch update request of an application entity. Therefore, after receiving an update request for the desired state, the device updates the actual state of the device. If the update is successful, the device updates reported to ON. The application has subscribed to the reported. Therefore, when a reported state changes to ON, the IN-AE receives a notification indicating that the actual state of the device is synchronized with desired.

However, in this process, because the application has no expectation of a specific time for the device to execute an instruction, in order to wait for confirming whether the device state changes, the application may need to be online for a long time to monitor the device state. In addition, this process may be very long, causing the application to consume resources for nothing. Moreover, in this method, different update policies for different devices in a factory scenario are not considered. There is a waste of resources and requirements cannot be met because the device sequentially executes instructions of each application.

A technical problem to be resolved in this application is that when a device state is hosted on a platform, a gateway, or another server, there is a problem of synchronization between a representation state and an actual state. That is, problems of how to synchronize and when to synchronize need to be resolved.

Figure 5:
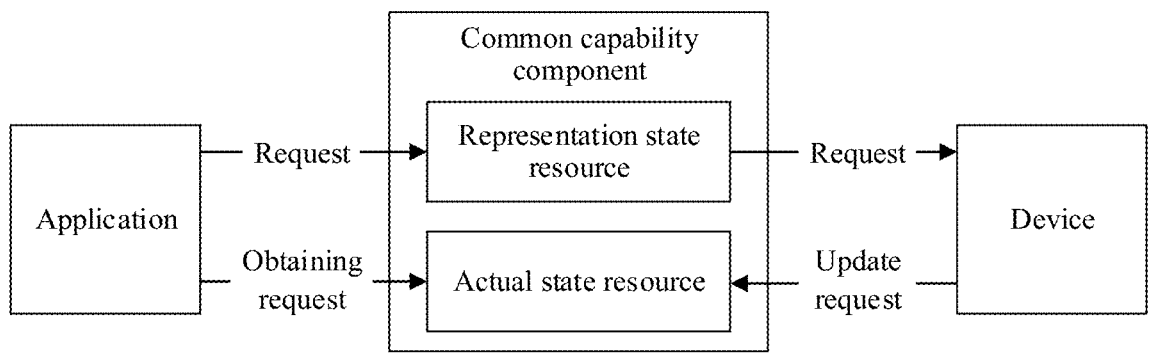
FIG. 5 is a diagram of a system architecture to which an embodiment of this application is applied.

FIG. 5 is an architectural diagram of a system to which an embodiment of this application is applied. In this application, two state resources of a device are maintained in a common capability component of an IoT platform, a gateway, or a device. One resource is a representation state resource and the other resource is an actual state resource.

It should be noted that the common capability component may be an independent entity device, or may be deployed on the IoT platform, the gateway, or the device.

The representation state resource includes a representation state instance resource, and the representation state instance resource is a child resource of the representation state resource. The actual state resource includes an actual state instance resource, and the actual state instance resource is a child resource of the actual state resource. Both the representation state resource and the actual state resource may have a plurality of child resources. A life cycle of a child resource depends on a parent resource of the child resource. If the parent resource is deleted, all child resources of the parent resource are deleted. The representation state resource may be understood as information about a state to which an application expects the device to switch. The actual state resource may be understood as information about an actual state of the device.

The representation state resource maintained in the common capability component receives a request sent by the application, to request to create a representation state instance resource. The representation state instance resource includes a device state updated by the application. The device monitors creation of the representation state instance resource. When the device finds that a new representation state instance resource is created, the device correspondingly switches a state of the device based on a device state in the representation state instance resource. After successfully switching the state, the device sends a request to the actual state resource maintained in the common capability component to create an actual state instance resource, and ensures that a latest actual state instance resource is synchronized with the device state. To obtain a current actual state of the device, the application needs to obtain the latest actual state instance resource in the actual state resource.

It may be understood that, that the device monitors creation of the representation state instance resource may be that the device passively receives information that is sent by the common capability component and that indicates that the representation state instance resource is successfully created, or may be that the device actively sends a request to the common capability component to request for information indicating whether the representation state instance resource is successfully created.

Figure 6:
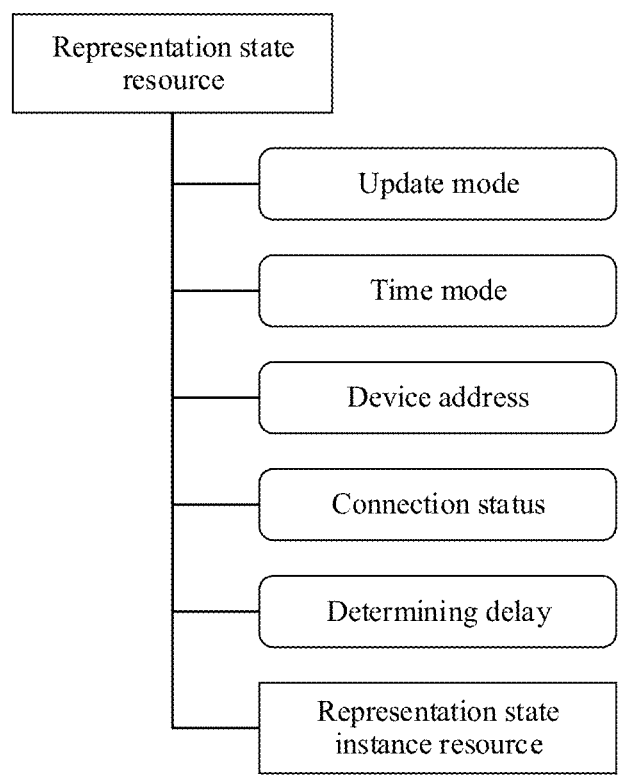
FIG. 6 is a schematic diagram of a representation state resource according to an embodiment of this application.

The representation state resource is set by the device or the application of the device, and a corresponding attribute is set in the representation state resource based on a feature of the device, to standardize a policy used by the application to request creation of the representation state resource and a policy used by the common capability component to transfer an update request to the device. For example, for an AGV, any update request for a representation state resource of the AGV is transferred to the device in time. On the contrary, for a pressure controller device, an update request for a representation state resource of the pressure controller device may be cached by a common capability component, and the common capability component sends only a latest update request to the device. FIG. 6 is a schematic diagram of a representation state resource according to an embodiment of this application.

An actual state resource is set by a device or an application of the device, and includes a device state and metadata of the device state, for example, a current state of the device, how long the current state of the device needs to be maintained, and other information, helping an application on a platform determine when a request can be sent.

A representation state resource of the device includes various attributes, for example, an update mode, a time mode, a device address, a connection status, and a determining delay. The representation state resource includes a representation state instance resource.

It may be understood that: (1) The update mode may be a sequence state or a latest state.

(2) The time mode may be a moment mode, a duration mode, the moment mode plus the duration mode, or the like.

(3) The device address indicates a device reachable address, and the common capability component may send a request to the device by using the device address.

(4) The connection status indicates a time schedule when the device is online, that is, a time period in which the device is online, and a time period in which the device sleeps or is offline. The common capability component may determine, based on the connection status, whether a request can be sent to the device.

(5) The determining delay is a time required in a time deterministic network from sending a message by the common capability component to successfully executing the message by the device. The time includes two parts. One part is a network transmission time, that is, a network delay for the common capability component to send a message to the device. The other part is a program delay from when the device receives the message to when a device state actually changes. A value of the determining delay is equal to a sum of a value of the network delay and a value of the program delay. The device may determine the program delay based on a software environment, and the value of the program delay is usually a fixed value. The value of the network delay is measured based on a time of communication between the device and the common capability component after the device goes online.

When the update mode is the sequence state, it indicates that the common capability component may sequentially transfer requests of the application for the representation state resource to the device one by one. None of the requests can be ignored, and sequences of the requests need to be consistent.

When the update mode is the latest state, it indicates that the common capability component may delete a request sent by the application for the representation state resource. When the common capability component finds that a connection status of the device is an unreachable state, the common capability component needs to retain only a latest representation state instance resource, and other old representation state instance resources may be discarded. After a connection of the device is restored or an address of the device is configured, the common capability component needs to send only a device state in the latest representation state instance resource to the device.

When the time mode is the moment mode, it indicates that the request needs to be executed on a side of the device at a specified moment, that is, the device needs to change the device state at the specified moment, for example, a switch is turned on or off at the specified moment.

When the time mode is the duration mode, it indicates that the request requires the device to maintain, for specified duration, a state that is obtained after execution of the request.

When the time mode is the moment mode plus the duration mode, it indicates that the device needs to change a state of the device at a specific time point and maintain the state for a specific period of time.

Figure 7:
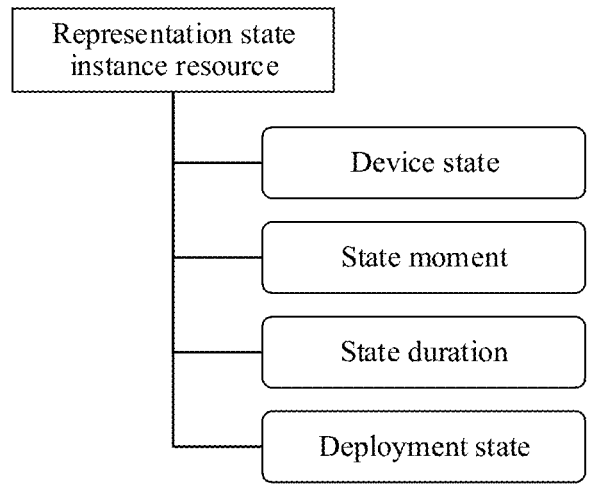
FIG. 7 is a schematic diagram of a representation state instance resource according to an embodiment of this application.

The representation state instance resource indicates an instance of a device state. The representation state instance resource includes the following attributes: the device state, a state moment, and state duration. FIG. 7 is a schematic diagram of a representation state instance resource according to an embodiment of this application.

The device state indicates a state to which an application intends to switch a device. For example, turning on a switch means switching a device state to ON, and turning off a switch means switching a device state to OFF.

The state moment indicates that the device switches to a specific state at a specified moment. For example, if the state moment is 20171228T122000.000, it means switching a state of the switch to ON or OFF at this moment.

The state duration indicates a time for which the device needs to maintain after switching to a specific state. For example, if the state duration is 60 s, it indicates that the switch needs to maintain ON for at least 60 seconds after being switched to ON.

A deployment state indicates whether the representation state instance resource has been forwarded to the device and executed by the device. If the representation state instance resource has been forwarded to the device and executed, a value of this attribute is "deployed". If the representation state instance resource is in a standby state, the value of this attribute is "undeployed". If the device is executing the representation state instance resource, the value of this attribute is "deploying".

Figure 8:
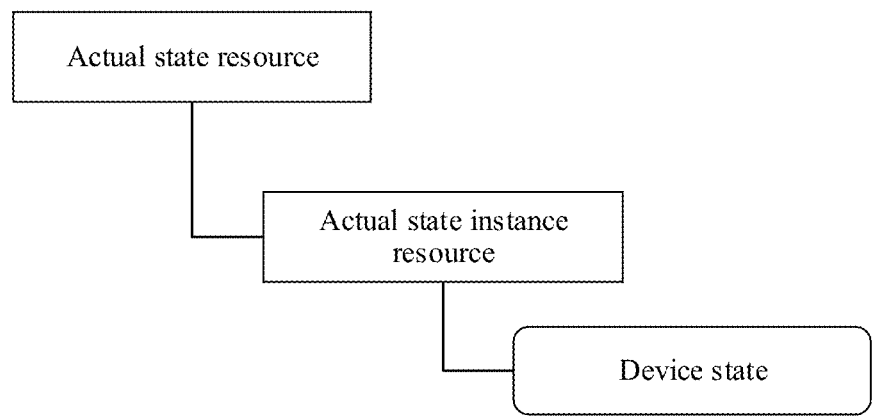
FIG. 8 is a schematic diagram of an actual state resource according to an embodiment of this application.

The actual state resource includes an actual state instance resource. The actual state resource may include a plurality of actual state instance resources. A latest actual state instance resource represents a current actual state of the device, and the state is stored in a device state attribute. FIG. 8 is a schematic diagram of an actual state resource according to an embodiment of this application.

Figure 9:
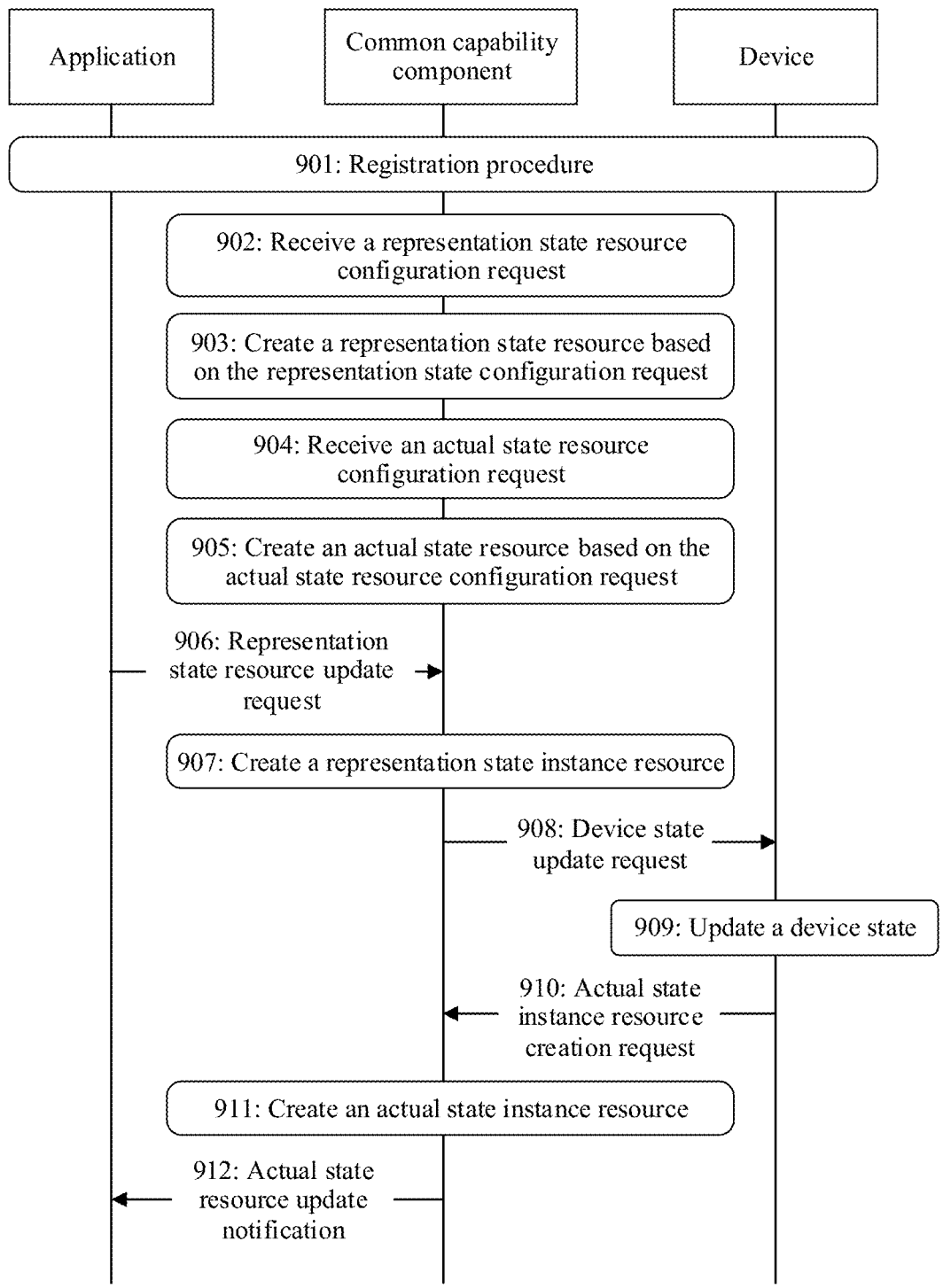
FIG. 9 is a schematic diagram of an embodiment of a device state synchronization method according to an embodiment of this application.

In this application, if a mentioned application is not specially described, it is considered that the application may be an application on a platform, an application on a gateway, or an application on a device. This is not specifically limited. A common capability component stores a representation state resource and an actual state resource of the device, and is responsible for synchronization with an actual state of the device. The following describes a method embodiment in this application by using an embodiment. FIG. 9 is a schematic diagram of an embodiment of a device state synchronization method according to an embodiment of this application. That is, the common capability component receives a request sent by the application. A device state synchronization procedure is shown as follows.

901: The application and the device separately register with the common capability component.

In this embodiment of this application, the application and the device separately register with the common capability component. The registration may include a procedure such as authentication or security key allocation. After the registration is completed, the application and the device may invoke a common capability provided by the common capability component, that is, may perform device state synchronization by using a device state synchronization method provided by the common capability.

902: The common capability component receives a representation state resource configuration request.

The common capability component receives a representation state resource configuration request sent by the application or the device. The representation state resource configuration request may carry the representation state resource of the device. The representation state resource configuration request may be from the device. To be specific, the device actively initiates a representation state resource creation request to the common capability component after the registration is completed based on a feature of the device, to open a service interface of the device to the application.

903: The common capability component creates a representation state resource based on the representation state configuration request.

The common capability component may create the representation state resource based on a representation state resource creation request. After the representation state resource of the device is successfully created, the application may control a state of the device by accessing the resource.

904: The common capability component receives an actual state resource configuration request.

The common capability component receives an actual state resource configuration request sent by the application or the device. The actual state resource configuration request may carry the actual state resource of the device. The actual state resource configuration request may also be understood as an actual state resource creation request. The request may be from the device. The device creates an actual state resource to update the actual state of the device, so that the application can access the actual state of the device.

905: The common capability component creates an actual state resource based on the actual state resource configuration request.

The common capability component may create the actual state resource based on the actual state resource creation request. It should be noted that a time sequence of steps 902 and 904 is not limited.

906: The common capability component receives a representation state resource update request sent by the application.

The representation state resource update request includes an identifier of the representation state resource. The representation state resource update request may be specifically a representation state instance resource creation request. The representation state instance resource is a child resource of the representation state resource.

907: The common capability component creates a representation state instance resource based on the representation state resource update request.

The common capability component determines whether the representation state instance resource can be successfully created. If the representation state instance resource is successfully created, the common capability component sends a device state update request to the device based on information in the representation state instance resource when a preset condition is met.

908: The common capability component sends the device state update request to the device.

909: The device updates the device state based on content in the device state update request.

910: The device sends an actual state instance resource creation request to the common capability component.

That is, after the device state is successfully updated, the device sends an actual state resource update request to the common capability component. It may be understood that the actual state resource update request may be the actual state instance resource creation request.

911: The common capability component creates an actual state instance resource based on the actual state instance resource creation request.

912: The common capability component sends an actual state resource update notification to the application.

The application can learn that the actual state of the device has changed.

In this embodiment of this application, the common capability component receives a first representation state instance resource creation request sent by the application, where the first representation state instance resource creation request includes the device state attribute. The common capability component creates the first representation state instance resource based on the first representation state instance resource creation request and a created second representation state instance resource. The common capability component sends the device state update request to the device, where the device state update request includes the device state attribute. The common capability component receives the actual state instance resource creation request sent by the device. The common capability component creates the actual state instance resource based on the actual state instance resource creation request. The common capability component sends the actual state resource update notification to the application. In this way, the common capability component can maintain a plurality of representation state instance resources, and complete synchronization between the representation state and the actual state of the device, thereby improving processing efficiency.

Figure 10A:
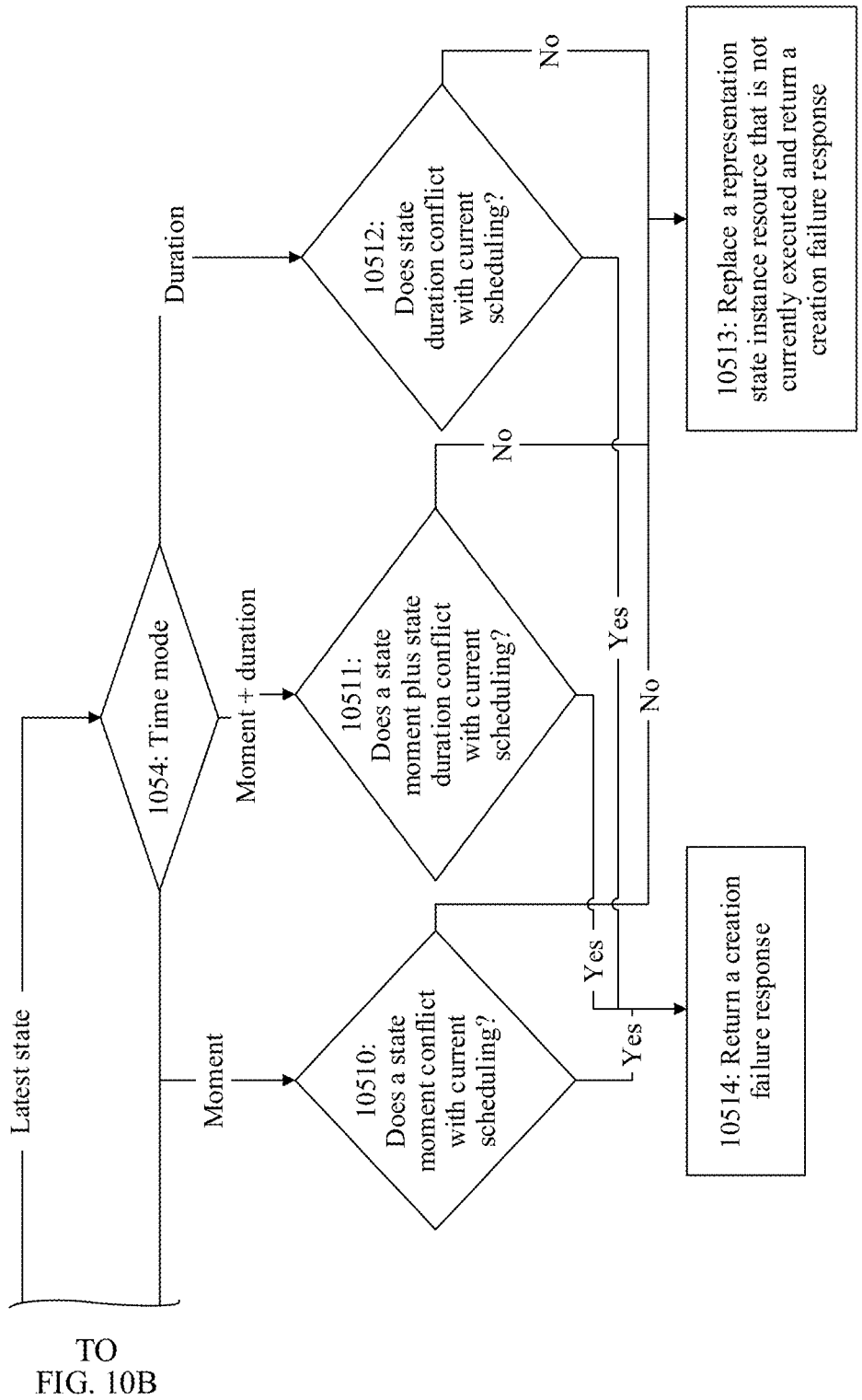
FIG. 10A and FIG. 10B are a schematic diagram of an embodiment in which a common capability component creates a representation state instance resource according to an embodiment of this application.
Figure 10B:
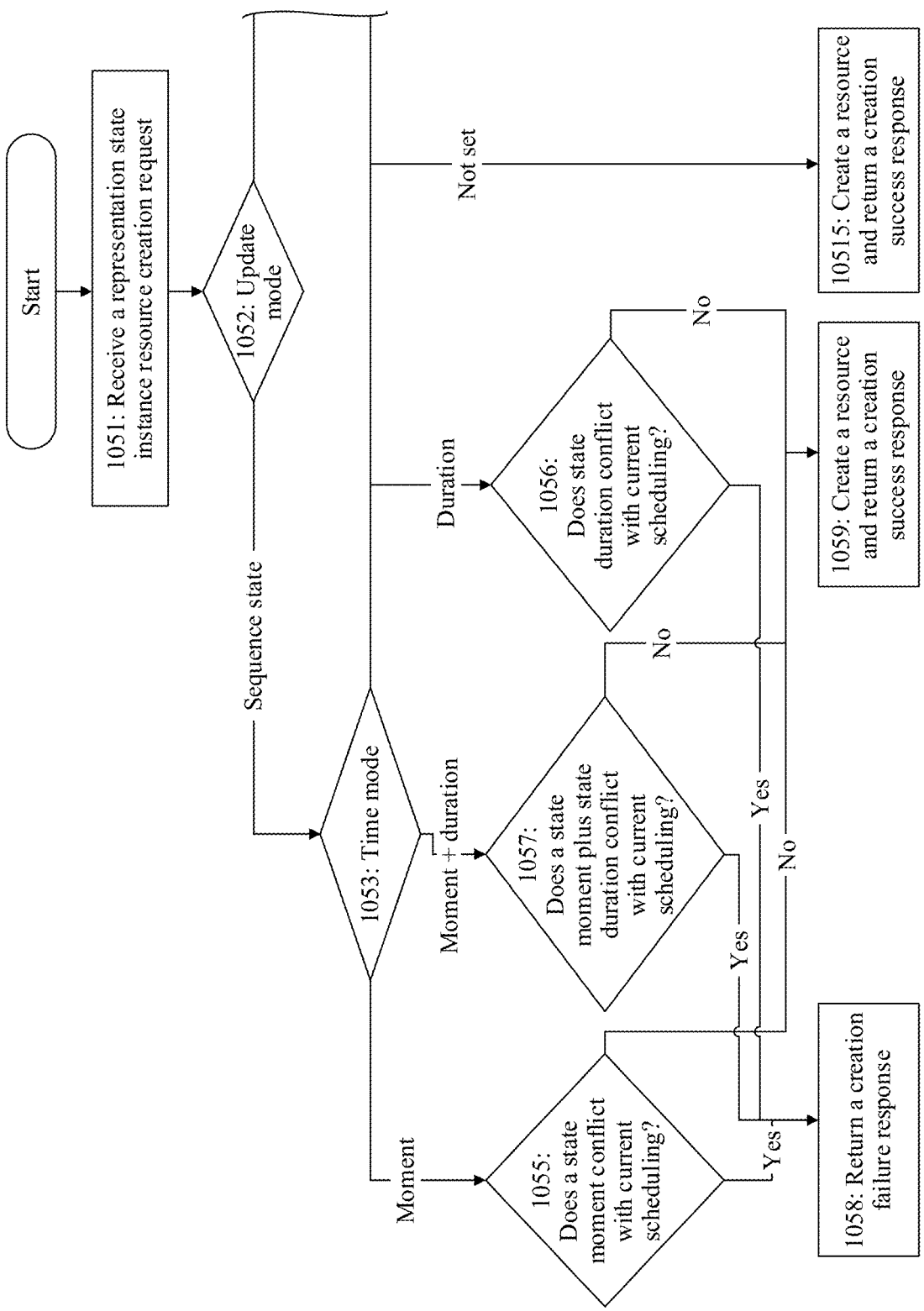

FIG. 10A and FIG. 10B are a schematic diagram of an embodiment in which a common capability component receives a representation state resource update request sent by an application and the common capability component creates a representation state instance resource based on the representation state resource update request according to an embodiment of this application. This is shown as follows:

1051: The common capability component receives a representation state instance resource creation request sent by the application.

The representation state instance resource creation request includes a device state attribute, and optionally, may further include an attribute such as a state moment or state duration. It may be understood that a device state indicates a new state to which the application expects a device to switch. The state moment indicates that the application plans to switch the device state at this moment. The state duration indicates that the application plans to cause the device to maintain this state for a specific period of time.

The representation state instance resource creation request may further include an identifier of the representation state resource. The representation state instance resource creation request may include both the state moment and the state duration, or may include only either of the state moment and the state duration.

1052: The common capability component determines that an update mode in the representation state resource is a sequence state or a latest state.

When the update mode is the sequence state, step 1053 is performed. When the update mode is the latest state, step 1054 is performed.

1053: Further determine a time mode of the representation state resource when the update mode of the representation state resource is the sequence state.

If the time mode is a moment mode, step 1055 is performed. If the time mode is a duration mode, step 1056 is performed. If the time mode is the moment mode plus the duration mode, step 1057 is performed.

1054: Further determine a time mode of the representation state resource when the update mode of the representation state resource is the latest state.

If the time mode is a moment mode, step 10510 is performed. If the time mode is a duration mode, step 10511 is performed. If the time mode is the moment mode plus the duration mode, step 10512 is performed.

1055: When the update mode of the representation state resource is the sequence state and the time mode is the moment mode, it indicates that each created representation state instance resource needs to be synchronized to the device, and synchronization of the device needs to comply with a specific moment.

The common capability component determines whether a required device state can be synchronized to the device at a specified moment. Specifically, the following may be included: determining, by the common capability component, whether a connection status of the device is reachable at the specified moment; and determining, based on the connection status and a determining delay, whether the device state can be switched at the specified moment.

Figure 11:
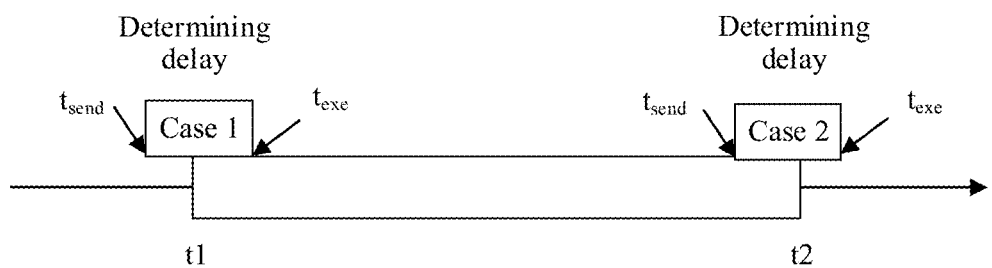
FIG. 11 is a schematic diagram showing that a common capability component creates a representation state instance resource according to an embodiment of this application.

FIG. 11 is a schematic diagram showing that a common capability component creates a representation state instance resource. The determining delay is duration indicated by a shadow part. A representation state instance resource creation request received by the common capability component includes a state moment texe and a device state, indicating that the common capability component needs to ensure that a device can switch the device state based on a device state attribute at the moment texe.

In a case 1, texe is between t1 and t2. Considering a length of the determining delay, the common capability component needs to send a device state update request to the device at a moment tsend, to ensure that the device can switch the device state after the determining delay. In this case, the common capability component successfully creates the representation state instance resource and returns a creation success response 1059.

In a case 2, texe is outside t1 and t2. Therefore, the common capability component rejects the representation state instance resource creation request, and returns a creation failure response 1058.

In addition, because the update mode of the representation state resource is the sequence state, the common capability component further needs to determine, in representation state instance resources that have been successfully created but whose deployment states are still false, whether there is a representation state instance resource whose state moment conflicts with that of a representation state instance resource in the representation state instance resource creation request. If a conflict is found, the creation failure response is returned 1058.

If the representation state instance resource creation request received by the common capability component carries a state duration attribute, the common capability component needs to return the creation failure response 1058. Because the time mode is the moment mode, the device cannot accept the time mode of specified duration.

1057: When the update mode of the representation state resource is a sequence mode, and the time mode is the moment mode plus the duration mode, it indicates that each created representation state instance resource needs to be synchronized to the device, and synchronization of the device needs to comply with a specific moment and duration.

Figure 12:
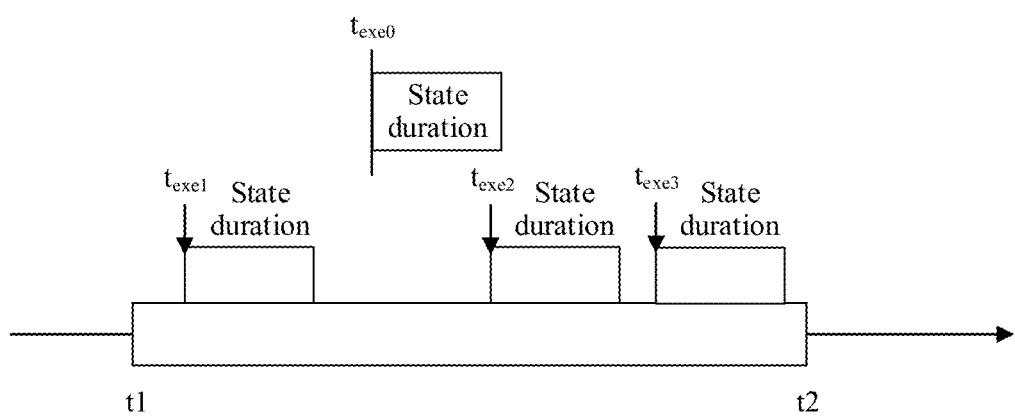
FIG. 12 is another schematic diagram showing that a common capability component creates a representation state instance resource according to an embodiment of this application.

When the common capability component receives the representation state instance resource creation request, and the representation state instance resource creation request includes a state moment attribute, a state duration attribute, and a device state attribute, it indicates that the common capability component needs to switch the device to the device state at the state moment and maintain for a time of the state duration. FIG. 12 is another schematic diagram showing that a common capability component creates a representation state instance resource.

texe0 represents a state moment and a state duration of a to-be-created representation state instance resource in a representation state instance resource creation request. This is shown in FIG. 12. Because the update mode is the sequence state, the common capability component needs to determine a relationship between texe0, existing representation state instance resources whose state moments are, texe1, texe2, and texe3, and state duration of the representation state instance resources, to determine whether the to-be-created representation state instance resource can be successfully created.

If texe0 is in a blank area between texe1 and texe2, and a result obtained by adding texe0 to the state duration still does not exceed texe2, it indicates that the representation state instance resource can be successfully created. The common capability component creates the representation state instance resource and returns the creation success response 1059. If texe0 is between texe2 and texe3 or elsewhere, the creation fails because a result obtained by adding texe0 to the state duration conflicts with another successfully created representation state instance resource. The common capability component returns the creation failure response 1058.

If the representation state instance resource creation request carries only one of the state moment or the state duration, a relationship between a state moment and state duration of the to-be-created representation state instance resource and those of an existing representation state instance resource needs to be comprehensively determined, to determine whether the creation can be successful.

Figure 13:
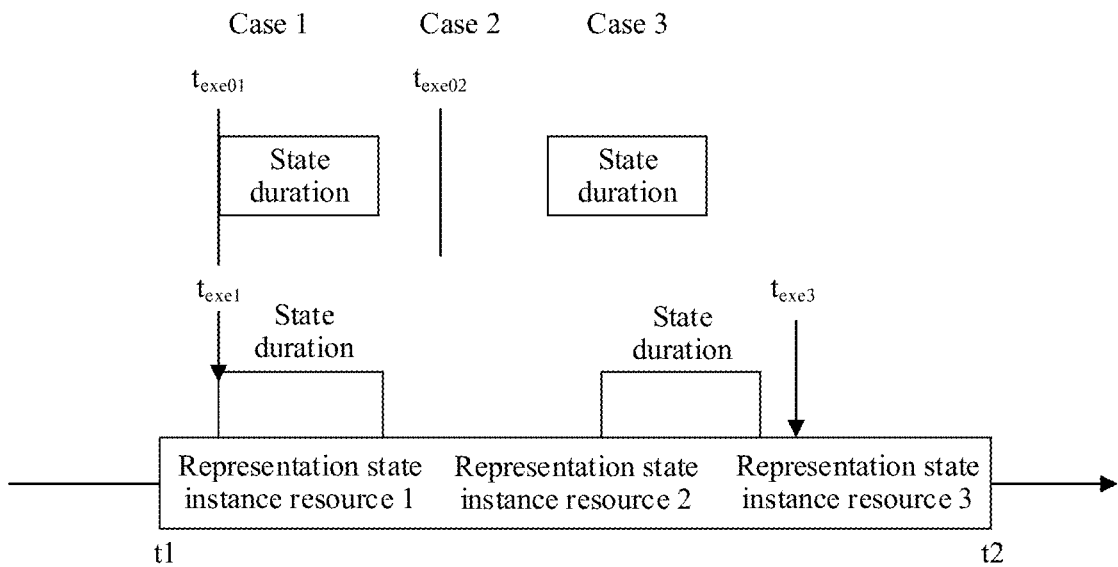
FIG. 13 is another schematic diagram showing that a common capability component creates a representation state instance resource according to an embodiment of this application.

For example, FIG. 13 is another schematic diagram showing that a common capability component creates a representation state instance resource. There are three existing representation state instance resources. A state moment of a representation state instance resource 1 is texe1, and state duration of the representation state instance resource 1 is shown in FIG. 13. No state moment is set for a representation state instance resource 2, and state duration of the representation state instance resource 2 is shown in FIG. 13. A state moment of a representation state instance resource 3 is texe3, and no state duration is set for the representation state instance resource 3. When there are three different cases for the to-be-created representation state instance resource, the following process is performed:

Case 1: When the state moment texe01 and the state duration are set for the to-be-created representation state instance resource, a performed process is described above.

Case 2: When only the state moment texe02 is set for the to-be-created representation state instance resource, the to-be-created representation state instance resource can be successfully created provided that it is determined that texe02 does not conflict with the three existing representation state instance resources.

Case 3: When only the state duration is set for the to-be-created representation state instance resource, because there is no constraint on the state moment, the common capability component determines whether the to-be-created representation state instance resource can be successfully created if currently the process is immediately performed. If it is determined that the device is currently online, and currently the device is not within state duration of a representation state instance resource, the resource is successfully created and the success response is returned 1059.

Otherwise, a next time for successful creation is sequentially determined. For example, if texe1 shown in FIG. 13 conflicts with the representation state instance resource 1, the to-be-created representation state instance resource may be created between the representation state instance resource 1 and the representation state instance resource 2.

After the creation succeeds, the common capability component needs to allocate a state moment attribute to the newly created representation state instance resource. The state moment attribute is a specific moment that is used for switching the device state and that is allocated by the common capability component based on a specific situation. In addition, the common capability component needs to add the allocated state moment attribute to the creation success response, to notify the application device of the moment for switching the device state. If no time for creating the to-be-created representation state instance resource can be found within a known online time of the device, the creation failure response is returned 1058.

1056: When the update mode of the representation state resource is the sequence mode and the time mode is the duration mode, it indicates that each created representation state instance resource needs to be synchronized to the device, and synchronization of the device needs to comply with specific duration.

Figure 14:
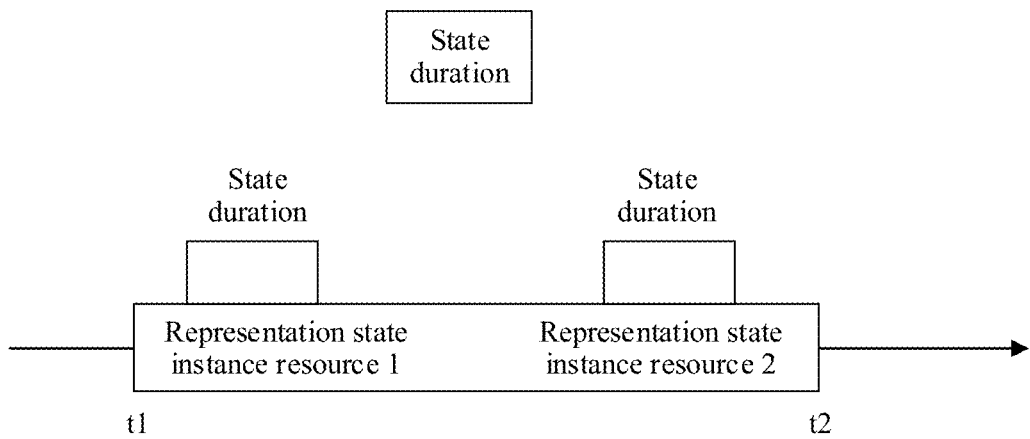
FIG. 14 is another schematic diagram showing that a common capability component creates a representation state instance resource according to an embodiment of this application.

When the common capability component receives the representation state instance resource creation request, the representation state instance resource creation request includes a state duration attribute. When there is another representation state instance resource in the representation state resource, whether the representation state instance resource creation request can be successful is shown in FIG. 14. FIG. 14 is another schematic diagram showing that a common capability component creates a representation state instance resource.

The common capability component determines, in a known time period in which the device is online, a first time period other than a time period that has been reserved by the another representation state instance resource, and returns the creation success response 1059 after the creation succeeds. As described in the case 3 in step 1057, details are not described herein again.

10515: If the update mode is set for the representation state resource but the time mode is not set, the common capability component determines, based on a current device state, whether the representation state instance resource can be created, and after the creation, immediately indicates the device to perform the device state update request to switch the device state.

Specifically, when determining that the device is currently online, and determining that currently the device is not requested to maintain specific state duration, the common capability component creates the representation state instance resource, and returns a creation success response 10515. Otherwise, a creation failure response is returned.

10510: When the update mode of the representation state resource is the latest state, and the time mode is the moment mode, during creation of the representation state instance resource, if the representation state instance resource creation request includes the state moment attribute, and there is another representation state instance resource at the state moment, only a latest representation state instance resource needs to be synchronized to the device, and an old representation state instance resource is replaced.

Figure 15:
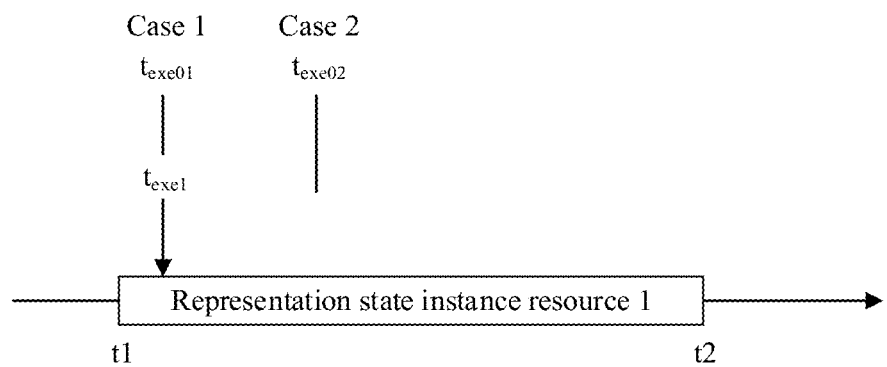
FIG. 15 is another schematic diagram showing that a common capability component creates a representation state instance resource according to an embodiment of this application.

Specifically, the common capability component receives the representation state instance resource creation request, and the representation state instance resource creation request includes the state moment attribute. FIG. 15 is another schematic diagram showing that a common capability component creates a representation state instance resource.

The representation state resource already includes the representation state instance resource 1, and a time at which the representation state instance resource 1 includes the state moment is texe1. If a moment in the state moment attribute of the to-be-created representation state instance resource is texe01, and texe01=texe1, the representation state instance resource 1 is replaced with the to-be-created representation state instance resource, and a creation success response is returned. If the moment in the moment attribute is texe02, and texe02≠texe1, the representation state instance resource is directly created, and a success response is returned 10513.

Figure 16:
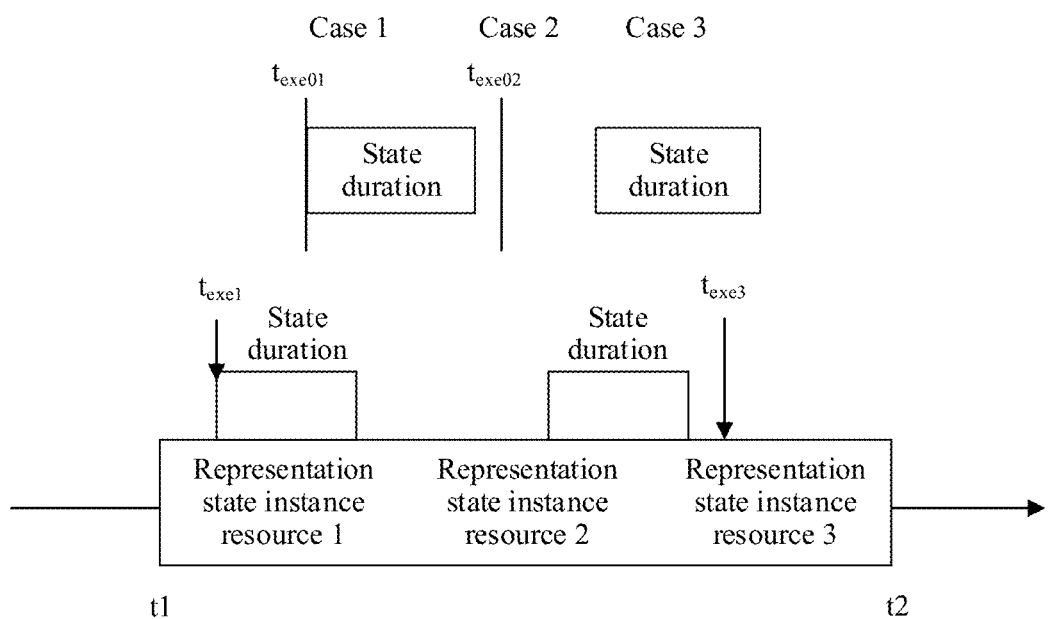
FIG. 16 is another schematic diagram showing that a common capability component creates a representation state instance resource according to an embodiment of this application.

10511: When the update mode of the representation state resource is the latest state, and the time mode is the moment mode plus the duration mode, during creation of the representation state instance resource, if the representation state instance resource includes a state moment attribute or a state duration attribute, and at the state moment or in the state duration, there is another representation state instance resource and a conflict is already caused (FIG. 16 is another schematic diagram showing that a common capability component creates a representation state instance resource), the common capability component receives the representation state instance resource creation request, and the created representation state resource already includes three representation state instance resources. A processing manner varies with different cases.

Case 1: When the to-be-created representation state instance resource includes both the state duration and the state moment, if texe01 is greater than texe1 and is within the state duration of the representation state instance resource 1, or texe01 is less than texe1 and texe1 is within the state duration of the to-be-created representation state instance resource, or the state duration of the to-be-created representation state instance resource overlaps the state duration of the representation state instance resource 2; or texe3 falls within the state duration of the to-be-created representation state instance resource, the representation state instance resource is successfully created. Correspondingly, the conflicting representation state instance resource 1, 2, or 3 is replaced and deleted, and the success response is returned 10513.

Case 2: When the to-be-created representation state instance resource includes only a moment, if the to-be-created representation state instance resource conflicts with the representation state instance resource, for example, texe02 is within the state duration of the representation state instance resource 1 or 2, or texe02=texe3, the representation state instance resource is successfully created. Correspondingly, the conflicting representation state instance resource 1, 2, or 3 is replaced and deleted, and the success response is returned 10513.

Case 3: When the to-be-created representation state instance resource includes only the state duration, the common capability component determines a first device reachable time, for example, t1 in FIG. 16, successfully creates the representation state instance resource, replaces another conflicting representation state instance resource, and returns the creation success response 10513. If there is another representation state instance resource within required state duration, for example, the representation state instance resource 1 in FIG. 16, the resource is replaced. When creating the representation state instance resource, the common capability component needs to allocate a specific value to the state moment based on a situation to indicate that the device is to switch the state at the moment, and adds the state moment to the success response.

Figure 17:
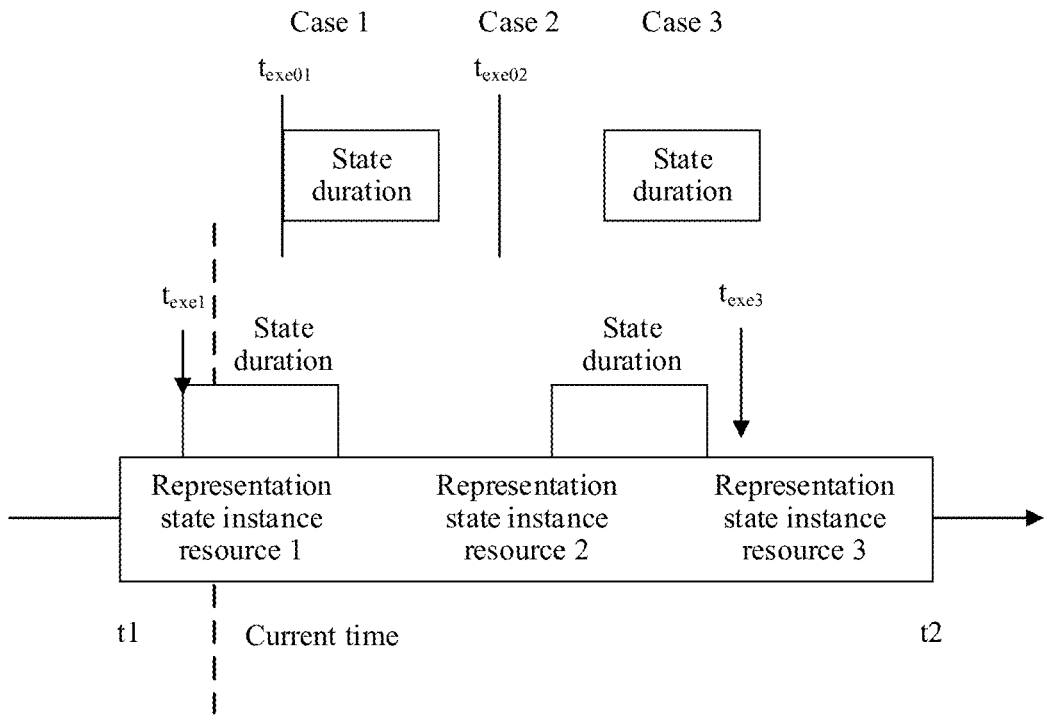
FIG. 17 is another schematic diagram showing that a common capability component creates a representation state instance resource according to an embodiment of this application.

In the case 1 and the case 2, if the state duration of the to-be-created representation state instance resource conflicts with that of another representation state instance resource that is currently being executed, the creation fails, and a creation failure response is returned 10514. FIG. 17 is another schematic diagram showing that a common capability component creates a representation state instance resource.

If a current time is shown by a dashed line in FIG. 17, the common capability component has executed the representation state instance resource 1, and a deployment state is switched from "undeployed" to "deploying". For the case 1 and the case 2, if the time of texe01 or texe02 conflicts with the state duration of the representation state instance resource 1, the representation state instance resource creation request needs to be rejected. For the case 3, the common capability component should start searching for the first device reachable time after the execution of the representation state instance resource 1 is completed and the deployment state is switched to "deployed".

10512: When the update mode of the representation state resource is the latest state, and the time mode is the duration mode, it indicates that during creation of the representation state instance resource, if the representation state instance resource includes a state duration attribute, and the state duration conflicts with another created representation state instance resource, as shown in FIG. 18, where FIG. 18 is another schematic diagram showing that a common capability component creates a representation state instance resource, the following steps are performed.

Figure 18:
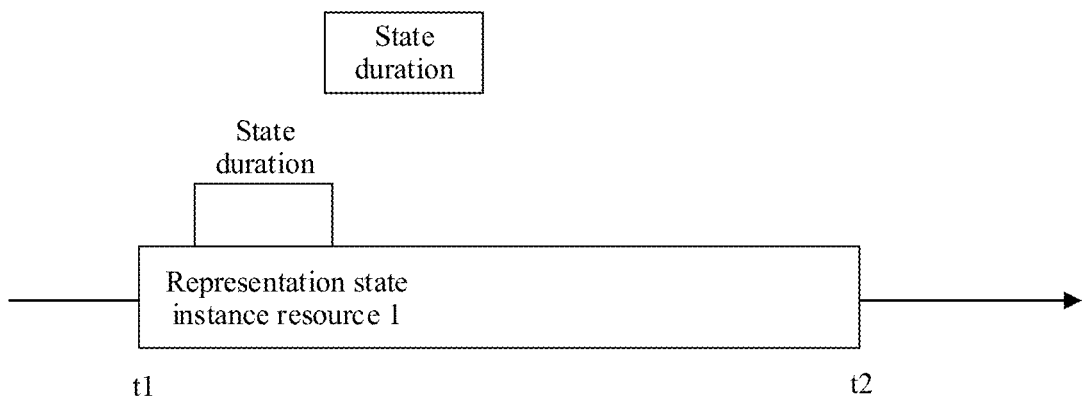
FIG. 18 is another schematic diagram showing that a common capability component creates a representation state instance resource according to an embodiment of this application.

The common capability component creates the representation state instance resource in a first available time period in which the device is reachable, for example, starting from t1 in FIG. 18. If the representation state instance resource conflicts with another representation state instance resource, for example, the representation state instance resource 1 in FIG. 18, the representation state instance resource 1 is replaced and deleted. In addition, the common capability component needs to allocate a state moment to the created representation state instance resource based on a situation, and adds the state moment to the response, to notify the application of a time for actually switching the device state.

In this embodiment of this application, a detailed description of how the common capability component successfully creates the representation state instance resource is mainly described, thereby increasing feasibility of the solution.

Figure 19:
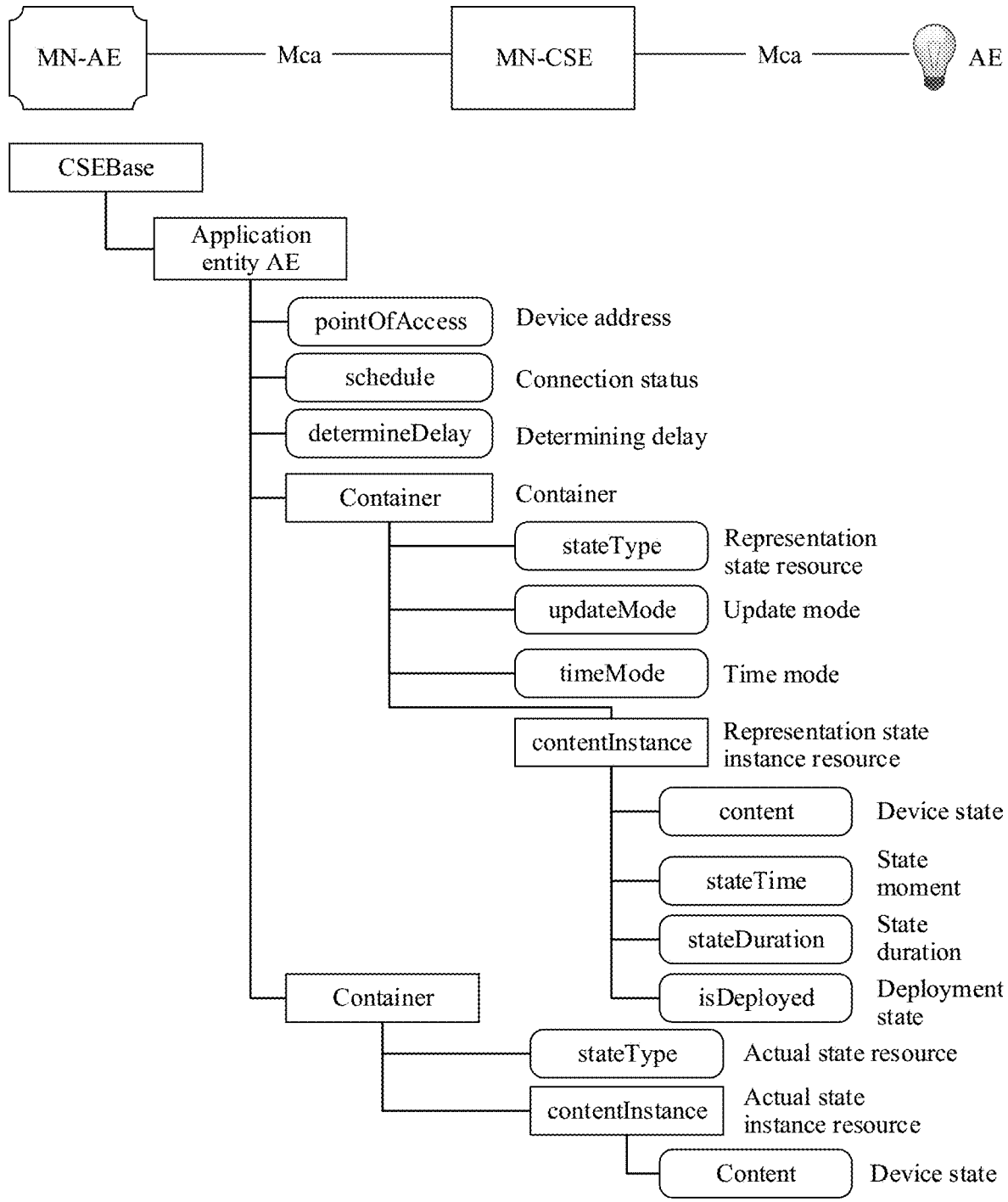
FIG. 19 is a schematic diagram of an embodiment based on a oneM2M standard according to an embodiment of this application.

Embodiment 2: FIG. 19 is a schematic diagram of an embodiment based on a oneM2M standard according to this application. An MN-CSE is a common capability middleware of a middle node, and is connected to a switch of an indicator through an Mca interface defined by oneM2M. The switch is equivalent to a device. In addition, as an application, an AE is connected to a common capability component of the MN-CSE.

(1) oneM2M is used as an example for description, and an update mode in the oneM2M is a sequence state.

The oneM2M uses a container (container) resource to represent a state of the device. For example, a switch device uses a container resource to represent an ON or OFF state of the switch device. The container contains one or more instance (contentInstance) child resources. Each contentInstance child resource indicates a historical record of a switch state. Each contentInstance child resource contains attributes such as a creation time (creationTime) and content (content), where creationTime is a creation time of the contentInstance, and content is a value of ON or OFF. The container resource may include a plurality of contentInstances. A latest creationTime is a current state of the switch.

The container resource is the representation state resource and the actual state resource in this application. For example, two container resources are created by using a oneM2M protocol control switch, to respectively indicate a representation state resource and an actual state resource for the switch. The contentInstance in the container is a representation state instance resource and an actual state instance resource.

A101: An MN-AE and the AE separately register with the MN-CSE.

Specifically, the MN-AE and the AE separately send an application entity creation (Create AE) request to the MN-CSE, and after the registration, an AE resource corresponding to the MN-AE and an AE resource corresponding to the AE are separately created on a resource CSEBase of the MN-CSE. As shown in FIG. 19, the AE resource created by the AE is a child resource of the CSEBase. The AE resource includes an attribute access point (pointOfAccess) that is an access address of the switch device.

For example, the access address is http://1.1.1.1:8080/app. The MN-CSE can access the AE through this address. schedule is a connection status of the AE and indicates a time period in which the AE is reachable. determineDelay is a round-trip time in which a request is sent to the AE and is successfully executed by the AE, and the time is determined by the AE based on a local environment of the AE (for example, a program execution time or an MN-CSE network delay).

A102: The AE sends a resource creation (create container) request to the MN-CSE, to request to access an address of the AE resource.

A container child resource is created under the AE resource. The container child resource includes the following attributes: stateType being desired, indicating that the container resource is a representation state resource; an update mode (updateMode) being a sequence state (sequence), indicating that the MN-CSE is in the sequence state when the MN-CSE synchronizes a container resource state to the AE; and a time mode (timeMode), indicating a time mode for synchronization. An ID of the container resource is container-desired.

A103: The AE sends a create container request to the MN-CSE, to request to access an address of the AE resource.

A container child resource is created under the AE. The container child resource includes an attribute state type (stateType) of actual (actual), indicating that the container resource is an actual state resource. An ID of the container resource is container-actual.

A104: The MN-AE sends create contentInstance to the container-desired.

An ID of the contentInstance is contentInstance-0. contentInstance-0 includes: a content attribute representing a device state, and being ON, indicating that the switch is turned on; a stateTime attribute representing a state moment, indicating that the switch is turned on at a specific moment; and stateDuration representing state duration, indicating duration.

A105: The MN-CSE first determines all contentInstance resources whose isDeployed is false in the container-desired, where none of states of these resources have been synchronized to the AE.

It is assumed that these resources are contentInstance-1, contentInstance-2, and contentInstance-3. Then, whether contentInstance-0 can be created is determined based on the resources contentInstance-0, contentInstance-1, contentInstance-2, and contentInstance-3, a schedule attribute of the AE resource, a determineDelay attribute, and timeMode. There are cases as follows: (time indicates the stateTime attribute and duration indicates the stateDuration attribute):

TABLE 1

| Resources | contentInstance-0 | | contentInstance-1 | | contentInstance-2 | | contentInstance-3 | | AE |
|---|---|---|---|---|---|---|---|---|---|
| Attribute | time | duration | time | duration | time | duration | time | duration | timeMode |
| Case 1 | 5 | / | 10 | / | 30 | / | 50 | / | TIME |
| Case 2 | 70 | / | 10 | / | 30 | / | 50 | / | TIME |
| Case 3 | 10 | / | 10 | / | 30 | / | 50 | / | TIME |
| Case 4 | 0 | 10 | 10 | 5 | 30 | 20 | 50 | 10 | MIXED |
| Case 5 | 15 | 20 | 10 | 5 | 30 | 20 | 50 | 10 | MIXED |
| Case 6 | 18 | / | 10 | 5 | 30 | 20 | 50 | 10 | MIXED |
| Case 7 | / | 10 | 10 | 5 | 30 | 20 | 50 | 10 | DURATION |
| Case 8 | / | 15 | 10 | 5 | 30 | 20 | 50 | 10 | DURATION |
| Case 9 | / | 20 | 10 | 5 | 30 | 20 | 50 | 10 | DURATION |

As shown in the foregoing Table 1, the schedule attribute of the AE is one hour from 20180130T000000:000 to 20180130T006000:000, and for ease of description, is written as 00 to 60 herein. A number of stateTime of each contentInstance represents a quantity of minutes starting from 00. stateDuration represents a quantity of minutes in duration. The determineDelay from when the MN-CSE sends a message to when the switch actually switches the state is 1s. If timeMode is TIME, it indicates that the time mode is a moment mode. If timeMode is MIXED, it indicates that the time mode is a moment mode plus a duration mode. If timeMode is DURATION, it indicates that the time mode is a duration mode. Based on a state of a to-be-created contentInstance resource and states of three existing contentInstance resources in the container-desired, there may be specifically seven cases, as shown in the foregoing table. Based on the description of step 905, specific explanations are as follows:

Case 1: Because there is no conflict relationship between contentInstance-0 and contentInstance-1, 2, and 3, the creation is successful.

Case 2: Because stateTime of contentInstance-0 exceeds a reachable time of the schedule of the AE, the creation fails.

Case 3: Because the stateTime of contentInstance-0 conflicts with that of contentInstance-1, the creation fails.

Case 4: Because a time period of contentInstance-0 can be exactly embedded between a start time of the schedule of the AE and a start time of contentInstance-1, the creation is successful.

Case 5: Because a start time of contentInstance-0 is after that of contentInstance-1 but duration of contentInstance-0 conflicts with that of contentInstance-2, the creation fails.

Case 6: Because stateTime of contentInstance-0 is an idle time exactly between contentInstance-1 and contentInstance-2, the creation is successful.

Case 7: Because duration of contentInstance-0 is 10, and a first time period that is determined by the MN-CSE within a reachable time of the AE and that meets a condition is 0 to 10, the creation is successful, and stateTime of contentInstance-0 is set to 0.

Case 8: Because duration of contentInstance-0 is 15, and a first time period that is determined by the MN-CSE within a reachable time of the AE and that meets a condition is 15 to 30 after contentInstance-1 ends, the creation is successful, and stateTime of contentInstance-0 is set to 15.

Case 9: Because duration of contentInstance-0 is 20, and within a reachable time of the AE, there is no proper time period in which the MN-CSE can perform the creation successfully, the creation fails.

A106: The MN-CSE sends a device state update request to the AE at a moment obtained by subtracting determineDelay from a first state moment in the plurality of contentInstance child resources in the container-desired, where the device state update request carries content of the content attribute in the contentInstance.

A107: The AE switches a device state based on the device state update request received from the MN-CSE.

A108: After updating the device state, the AE sends a create contentInstance request to the MN-CSE, to request to access container-actual, to indicate that the device has successfully switched the state currently. The create contentInstance request carries a current actual state of the device.

A109: The MN-CSE creates a contentInstance resource after receiving the request.

A110: The MN-CSE sends a notification to the MN-AE, to indicate that the device state is successfully switched.

(2) oneM2M is used as an example for description, and an update mode in the oneM2M is a latest state.

In this embodiment, a difference lies in that the update mode (updateMode) of the container-desired is the latest state (Latest), indicating that only a last request needs to be responded to at a same time.

B101: The MN-AE and the AE separately register with the MN-CSE. This is the same as A101.

B102: The AE sends a create container request to the MN-CSE, to request to access an address of the AE resource. A container child resource is created under the AE resource. The container child resource includes the following attributes: stateType being desired, indicating that the container resource is a representation state resource; updateMode being latest, indicating that the MN-CSE is in the latest state when the MN-CSE synchronizes a container resource state to the AE; and timeMode, indicating a time mode for synchronization. An ID of the container resource is container-desired.

B103: The AE sends a create container request to the MN-CSE, to request to access an address of the AE resource. This is the same as A103.

B104: The MN-AE sends create contentInstance to the container-desired. This is the same as A104.

B105: The MN-CSE first determines all contentInstance resources whose isDeployed is false in the container-desired, where none of states of these resources have been synchronized to the AE, and it is assumed that these resources are contentInstance-1, contentInstance-2, and contentInstance-3. Then, whether contentInstance-0 can be created is determined based on the resources contentInstance-0, contentInstance-1, contentInstance-2, and contentInstance-3, a schedule attribute of the AE resource, a determineDelay attribute, and timeMode. There are cases as follows: (time indicates the stateTime attribute and duration indicates the stateDuration attribute):

TABLE 2

| Resources | contentInstance-0 | | contentInstance-1 | | contentInstance-2 | | contentInstance-3 | | AE |
|---|---|---|---|---|---|---|---|---|---|
| Attribute | time | duration | time | duration | time | duration | time | duration | timeMode |
| Case 1 | 10 | / | 10 | / | 30 | / | 50 | / | TIME |
| Case 2 | 15 | 20 | 10 | 5 | 30 | 20 | 50 | 10 | MIXED |
| Case 3 | 10 | / | 10 | 5 | 30 | 20 | 50 | 10 | MIXED |
| Case 4 | / | 10 | 10 | 5 | / | / | / | / | DURATION |

In the foregoing example, the schedule attribute of the AE is one hour from 20180130T000000:000 to 20180130T006000:000, and for ease of description, is written as 00 to 60 herein. A number of stateTime of each contentInstance represents a quantity of minutes starting from 00. stateDuration represents a quantity of minutes in duration. The determineDelay from when the MN-CSE sends a message to when the switch actually switches the state is 1s. If timeMode is TIME, it indicates that the time mode is a moment mode. If timeMode is MIXED, it indicates that the time mode is a moment mode plus a duration mode. If timeMode is DURATION, it indicates that the time mode is a duration mode. Based on a state of a to-be-created contentInstance resource and states of three existing contentInstance resources in container-desired, there may be specifically seven cases, as shown in the foregoing table. Based on the description of step 905, specific explanations are as follows:

Case 1: Because contentInstance-0 conflicts with contentInstance-1, the creation is successful, and contentInstance-1 is replaced.

Case 2: Because contentInstance-0 conflicts with contentInstance-2, the creation is successful, and contentInstance-2 is replaced.

Case 3: Because contentInstance-0 conflicts with contentInstance-1, the creation is successful, and contentInstance-1 is replaced.

Case 4: The MN-CSE creates contentInstance-0 after receiving the request, and because contentInstance-0 conflicts with contentInstance-1, contentInstance-1 is replaced.

B106: The MN-CSE sends a device state update request to the AE at a moment obtained by subtracting determineDelay from a first state moment in the plurality of contentInstance child resources in the container-desired, where the device state update request carries content of the content attribute in the contentInstance. This is the same as A106.

B107: The AE switches a device state based on the device state update request received from the MN-CSE. This is the same as A107.

B108: After updating the device state, the AE sends a create contentInstance request to the MN-CSE, to request to access container-actual, to indicate that the device has successfully switched the state currently. The create contentInstance request carries a current actual state of the device. This is the same as A108.

B109: The MN-CSE creates a contentInstance resource after receiving the request. This is the same as A109.

B110: The MN-CSE sends a notification to the MN-AE, to indicate that the device state is successfully switched. This is the same as A110.

For example, in an actual application scenario, according to the technical solution of this application, when the application controls the device to perform an operation, different effects may be achieved in different cases.

(1) All instructions delivered by the application can be sequentially executed. For example, for an automated guided vehicle (automated guided vehicle, AGV) responsible for handling goods in a factory, an application sends instructions through a platform to instruct a robot to carry materials. Each instruction includes a source address and a destination address. Therefore, each request delivered by the application needs to be executed. Otherwise, goods may be overstocked or materials may be insufficiently provided.

(2) A latest instruction needs to be executed, to for example, control pressure, a liquid level, a fuel level, and a furnace temperature. Because a change process is slow and an action time period is relatively long, when a relatively large quantity of control instructions arrive in a serialized manner, if execution of a previous instruction is not completed or has not been performed, such execution may be directly skipped, and only a latest instruction needs to be executed.

(3) The instruction needs to be executed at a specified time. In a production control process, there are a large quantity of time-sensitive operations, such as controlling a speed of a conveyor belt and controlling a coordination relationship between assembly robots. Such operations need to be executed at a specified time to enable a production line to run properly. Otherwise, serious problems such as a production line stop and instrument collision may be caused.

(4) The device needs to run for a specific period of time. In some industrial scenarios, for example, cooling and air exhaust of an apparatus, based on efficiency of a cooling apparatus or an air exhaust apparatus, to achieve a relatively good cooling or air exhaust effect, it needs to be ensured that a running state of the device maintains a specified period of time. Otherwise, an accident may be caused.

Figure 20:
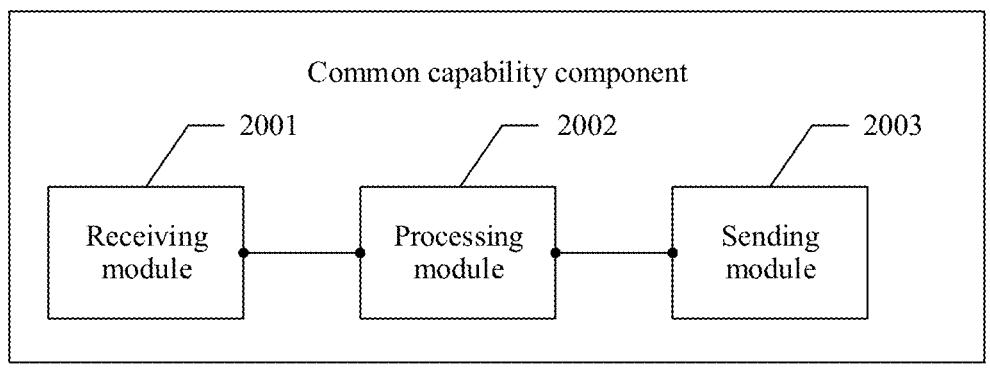
FIG. 20 is a schematic diagram of an embodiment of a common capability component according to an embodiment of this application.

FIG. 20 is another schematic diagram of an embodiment of a common capability component according to an embodiment of this application.

A receiving module 2001 is configured to: receive a first representation state instance resource creation request sent by an application, where the first representation state instance resource creation request includes a device state attribute; and receive an actual state instance resource creation request sent by a device.

A processing module 2002 is configured to: create a first representation state instance resource based on the first representation state instance resource creation request and a created second representation state instance resource, and create an actual state instance resource based on the actual state instance resource creation request.

A sending module 2003 is configured to: send a device state update request to the device, where the device state update request includes the device state attribute; and send, to the application, information indicating that an actual state resource is successfully created.

Optionally, in some embodiments of this application, the first representation state instance resource and the second representation state instance resource are child resources of a representation state resource.

The representation state resource includes an update mode and a time mode.

The update mode includes a sequence state or a latest state.

The time mode includes a moment mode, a duration mode, or a mixed mode. The mixed mode is the moment mode plus the duration mode.

Optionally, in some embodiments of this application, the first representation state instance resource creation request includes an identifier of the representation state resource, and at least one attribute of a first state moment and first state duration.

Optionally, in some embodiments of this application, the processing module 2002 is specifically configured to create the first representation state instance resource based on the second representation state instance resource and the at least one attribute of the first state moment and the first state duration.

Optionally, in some embodiments of this application, the first representation state instance resource creation request includes the first state moment and the first state duration.

The sending module 2003 is specifically configured to: send the device state update request to the device at a time point indicated by the first state moment, and indicate the device to maintain a device state unchanged within a time length indicated by the first state duration.

Optionally, in some embodiments of this application, the representation state resource includes a connection status attribute, and the connection status attribute indicates a time period [t1, t2] in which the common capability component is connected to the device.

The update mode of the representation state resource is the sequence state, and the time mode is the moment mode.

The first representation state instance resource creation request includes the first state moment.

The processing module 2002 is specifically configured to create the first representation state instance resource if it is determined that the first state moment falls within the time period [t1, t2] and is different from a second state moment of the created second representation state instance resource.

Optionally, in some embodiments of this application, the representation state resource includes a connection status attribute, and the connection status attribute indicates a time period [t1, t2] in which the common capability component is connected to the device.

The update mode of the representation state resource is the sequence state, and the time mode is the mixed mode.

The first representation state instance resource creation request includes the first state moment and the first state duration.

The processing module 2002 is specifically configured to create the first representation state instance resource if it is determined that a first time period falls within the time period [t1, t2] and does not overlap a second time period of the created second representation state instance resource, where the first time period uses the first state moment as a start moment and has a time length of the first state duration; or the processing module 2002 is specifically configured to create the first representation state instance resource if it is determined that the first state moment falls within the time period [t1, t2] and is different from a second state moment of the created second representation state instance resource; or the processing module 2002 is specifically configured to create the first representation state instance resource if it is determined that the first state duration falls within any idle time period in the time period [t1, t2] except a second time period of the created second representation state instance resource.

Optionally, in some embodiments of this application, the representation state resource includes a connection status attribute, and the connection status attribute indicates a time period [t1, t2] in which the common capability component is connected to the device.

The update mode of the representation state resource is the sequence state, and the time mode is the duration mode.

The first representation state instance resource creation request includes the first state duration.

The processing module 2002 is specifically configured to create the first representation state instance resource if it is determined that the first state duration falls within any idle time period in the time period [t1, t2] except a second time period of the created second representation state instance resource.

Optionally, in some embodiments of this application, the representation state resource includes a connection status attribute, and the connection status attribute indicates a time period [t1, t2] in which the common capability component is connected to the device.

The update mode of the representation state resource is the latest state, and the time mode is the moment mode.

The first representation state instance resource creation request includes the first state moment.

The processing module 2002 is specifically configured to: if it is determined that the first state moment falls within the time period [t1, t2] and is different from a second state moment of the created second representation state instance resource, delete the second representation state instance resource and create the first representation state instance resource.

Optionally, in some embodiments of this application, the representation state resource includes a connection status attribute, and the connection status attribute indicates a time period [t1, t2] in which the common capability component is connected to the device.

The update mode of the representation state resource is the latest state, and the time mode is the mixed mode.

The first representation state instance resource creation request includes the first state moment and the first state duration.

The processing module 2002 is specifically configured to: if it is determined that a first time period falls within the time period [t1, t2] and overlaps a second time period of the created second representation state instance resource, delete the second representation state instance resource and create the first representation state instance resource, where the first time period uses the first state moment as a start moment and has a time length of the first state duration; or the processing module 2002 is specifically configured to: if it is determined that the first state moment falls within the time period [t1, t2] and is different from a second state moment of the created second representation state instance resource, delete the second representation state instance resource and create the first representation state instance resource; or the processing module 2002 is specifically configured to: if it is determined that the first state duration falls within the time period [t1, t2], and the first state duration and a third time period that is obtained at t1 do not overlap a second time period of the created second representation state instance resource, delete the second representation state instance resource and create the first representation state instance resource.

Optionally, in some embodiments of this application, the representation state resource includes a connection status attribute, and the connection status attribute indicates a time period [t1, t2] in which the common capability component is connected to the device.

The update mode of the representation state resource is the latest state, and the time mode is the duration mode.

The first representation state instance resource creation request includes the first state duration.

The processing module 2002 is specifically configured to: if it is determined that the first state duration falls within the time period [t1, t2], and the first state duration and a third time period that is obtained at t1 overlap a second time period of the created second representation state instance resource, delete the second representation state instance resource and create the first representation state instance resource.

Optionally, in some embodiments of this application, the receiving module 2001 is further configured to: receive a representation state resource creation request, and receive an actual state resource creation request; and the processing module 2002 is further configured to: create a representation state resource based on the representation state resource creation request, and create an actual state resource based on the actual state resource creation request.

Figure 21:
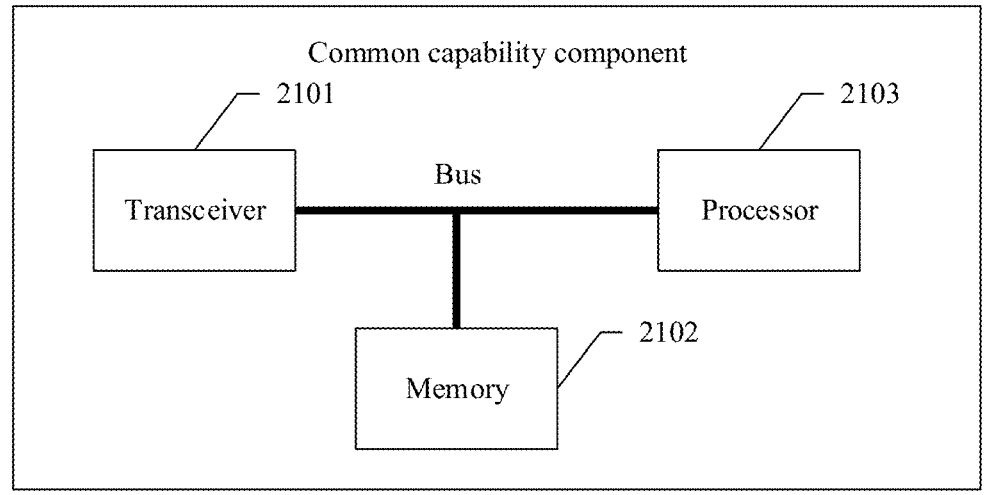
FIG. 21 is another schematic diagram of an embodiment of a common capability component according to an embodiment of this application.

FIG. 21 is a schematic structural diagram of a common capability component according to an embodiment of this application. The server may include:

a transceiver 2101, a memory 2102, and a processor 2103, where the transceiver 2101, the memory 2102, and the processor 2103 are connected through a bus. The steps performed by the common capability component in the foregoing embodiment may be based on a structure of the common capability component shown in FIG. 21. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes instructions for instructing a computer device (which may be a personal computer, a server, or a network device) to perform all or some of the steps of the methods described in the embodiments of this application. The foregoing storage medium includes various media that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A device state synchronization method, comprising:
receiving, by a common capability component, a first representation state instance resource creation request sent by an application, wherein the first representation state instance resource creation request comprises a device state attribute;
creating, by the common capability component, a first representation state instance resource based on the first representation state instance resource creation request and a created second representation state instance resource;
sending, by the common capability component, a device state update request to a device, wherein the device state update request comprises the device state attribute;
receiving, by the common capability component, an actual state instance resource creation request sent by the device;
creating, by the common capability component, an actual state instance resource based on the actual state instance resource creation request; and
sending, by the common capability component to the application, information indicating that an actual state resource was successfully created,
wherein the first representation state instance resource and the second representation state instance resource are child resources of a representation state resource;
the representation state resource comprises an update mode and a time mode;
the update mode comprises a sequence state or a latest state; and
the time mode comprises a moment mode, a duration mode, or a mixed mode, wherein the mixed mode is the moment mode plus the duration mode, and
the first representation state instance resource creation request comprises an identifier of the representation state resource, and at least one of a first state moment and first state duration, and
wherein the representation state resource comprises a connection status attribute, and the connection status attribute indicates a time period [t1, t2] in which the common capability component is connected to the device;

the update mode of the representation state resource is the sequence state, and the time mode is the moment mode;

the first representation state instance resource creation request comprises the first state moment; and the creating, by the common capability component, the first representation state instance resource based on the first representation state instance resource creation request and a created second representation state instance resource comprises:

when it is determined that the common capability component determines that the first state moment falls within the time period [t1, t2] and is different from a second state moment of the created second representation state instance resource, creating, by the common capability component, the first representation state instance resource.

2. The method according to claim 1, wherein the creating, by the common capability component, the first representation state instance resource based on the first representation state instance resource creation request and a created second representation state instance resource comprises: creating, by the common capability component, the first representation state instance resource based on the second representation state instance resource and the at least one attribute of the first state moment and the first state duration.

3. A common capability component, comprising:
a transceiver, configured to communicate with an apparatus other than the common capability component;
a memory, configured to store a computer executable instruction; and
one or more processors, connected to the memory and the transceiver through a bus, wherein when the computer executable instruction stored in the memory is executed by the processors, cause the common capability component to be configured to
receive a first representation state instance resource creation request sent by an application, wherein the first representation state instance resource creation request comprises a device state attribute;
create a first representation state instance resource based on the first representation state instance resource creation request and a created second representation state instance resource;
send a device state update request to a device, wherein the device state update request comprises the device state attribute;
receive an actual state instance resource creation request sent by the device;
create an actual state instance resource based on the actual state instance resource creation request; and
send to the application, information indicating that an actual state resource was successfully created, wherein the first representation state instance resource and the second representation state instance resource are child resources of a representation state resource;
the representation state resource comprises an update mode and a time mode;
the update mode comprises a sequence state or a latest state; and
the time mode comprises a moment mode, a duration mode, or a mixed mode, wherein the mixed mode is the moment mode plus the duration mode, and
wherein the representation state resource comprises a connection status attribute, and the connection status attribute indicates a time period [t1, t2] in which the common capability component is connected to the device;

the update mode of the representation state resource is the sequence state, and the time mode is the moment mode;

the first representation state instance resource creation request comprises the first state moment; and the create the first representation state instance resource based on the first representation state instance resource creation request and a created second representation state instance resource comprises:

when it is determined that the common capability component determines that the first state moment falls within the time period [t1, t2] and is different from a second state moment of the created second representation state instance resource, create the first representation state instance resource.

4. The common capability component according to claim 3, wherein the first representation state instance resource creation request comprises an identifier of the representation state resource, and at least one attribute of a first state moment and first state duration.

5. The common capability component according to claim 3, wherein the create the first representation state instance resource based on the first representation state instance resource creation request and a created second representation state instance resource comprises: create the first representation state instance resource based on the second representation state instance resource and the at least one attribute of the first state moment and the first state duration.

6. A computer-readable storage medium that comprises an instruction, wherein when the instruction is run on a computer, the computer is enabled to perform the method comprising:
receiving, by a common capability component, a first representation state instance resource creation request sent by an application, wherein the first representation state instance resource creation request comprises a device state attribute;
creating, by the common capability component, a first representation state instance resource based on the first representation state instance resource creation request and a created second representation state instance resource;
sending, by the common capability component, a device state update request to a device, wherein the device state update request comprises the device state attribute;
receiving, by the common capability component, an actual state instance resource creation request sent by the device;
creating, by the common capability component, an actual state instance resource based on the actual state instance resource creation request; and
sending, by the common capability component to the application, information indicating that an actual state resource was successfully created,
wherein the first representation state instance resource and the second representation state instance resource are child resources of a representation state resource;
the representation state resource comprises an update mode and a time mode;
the update mode comprises a sequence state or a latest state; and
the time mode comprises a moment mode, a duration mode, or a mixed mode, wherein the mixed mode is the moment mode plus the duration mode, and the first representation state instance resource creation request comprises an identifier of the representation state resource, and at least one of a first state moment and first state duration, and wherein the representation state resource comprises a connection status attribute, and the connection status attribute indicates a time period [t1, t2] in which the common capability component is connected to the device;

the update mode of the representation state resource is the sequence state, and the time mode is the moment mode;

the first representation state instance resource creation request comprises the first state moment; and the creating, by the common capability component, the first representation state instance resource based on the first representation state instance resource creation request and a created second representation state instance resource comprises:

when it is determined that the common capability component determines that the first state moment falls within the time period [t1, t2] and is different from a second state moment of the created second representation state instance resource, creating, by the common capability component, the first representation state instance resource.

* * * * *